United States Patent
Kazama

(10) Patent No.: US 6,891,279 B2
(45) Date of Patent: May 10, 2005

(54) VEHICLE CONTROL SYSTEM AND CONTROL METHOD

(75) Inventor: Isamu Kazama, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 163 days.

(21) Appl. No.: 10/258,594

(22) PCT Filed: Feb. 13, 2002

(86) PCT No.: PCT/JP02/01202

§ 371 (c)(1),
(2), (4) Date: Nov. 4, 2002

(87) PCT Pub. No.: WO02/070298

PCT Pub. Date: Sep. 12, 2002

(65) Prior Publication Data

US 2003/0094816 A1 May 22, 2003

(30) Foreign Application Priority Data

Mar. 6, 2001 (JP) .......................................... 2001-62500

(51) Int. Cl.⁷ .............................................. B60L 11/00
(52) U.S. Cl. ................. 290/40 C; 290/40 A; 290/40 B; 180/65.1; 180/60
(58) Field of Search ............................ 290/40 A, 40 B, 290/40 C, 41; 180/60, 65.1, 65.2, 65.3; 123/179.28

(56) References Cited

U.S. PATENT DOCUMENTS

| 5,621,304 | A | * | 4/1997 | Kiuchi et al. ................. 322/18 |
| 5,703,410 | A | * | 12/1997 | Maekawa ................. 290/40 C |
| 5,808,367 | A | * | 9/1998 | Akagi et al. ............... 290/40 C |
| 5,841,201 | A | * | 11/1998 | Tabata et al. ............. 290/40 C |
| 6,181,020 | B1 | * | 1/2001 | Uchida et al. ............ 290/40 C |
| 6,326,702 | B1 | * | 12/2001 | Yonekura et al. ......... 290/40 C |
| 6,441,506 | B2 | * | 8/2002 | Nakashima ............... 290/40 C |
| 6,470,983 | B1 | * | 10/2002 | Amano et al. ............. 180/65.2 |
| 6,570,266 | B1 | * | 5/2003 | Wakashiro et al. ........ 290/40 C |
| 6,700,213 | B1 | * | 3/2004 | Wakashiro et al. ........ 290/40 C |
| 6,707,169 | B2 | * | 3/2004 | Shimizu et al. ........... 290/40 C |

FOREIGN PATENT DOCUMENTS

| DE | 43 06 381 A1 | 11/1993 |
| EP | 0 718 950 A2 | 6/1996 |
| EP | 0 838 359 A2 | 4/1998 |
| EP | 0 943 475 A2 | 9/1999 |
| EP | 1 013 498 A2 | 6/2000 |
| EP | 1 099 591 A2 | 5/2001 |
| EP | 1 106 412 A2 | 6/2001 |
| JP | 8-182112 A | 7/1996 |
| JP | 09-222036 A | 8/1997 |
| JP | 11-324751 A | 11/1999 |
| JP | 2000-186590 A | 7/2000 |
| JP | 2000-224711 A | 8/2000 |
| JP | 2001-200741 A | 7/2001 |
| WO | WO 99/24280 A1 | 5/1999 |

* cited by examiner

Primary Examiner—Nicholas Ponomarenko
(74) Attorney, Agent, or Firm—Foley & Lardner LLP

(57) ABSTRACT

A control system for a vehicle, having drive sections (104, 107, 109), a power supply section (101, 103, 107, 109) including an electric power storage unit to supply power to the drive section, includes a demanded power calculating section (1) calculating a demanded drive power required for driving the vehicle, an allowable drive electric power output calculating section (2) calculating allowable drive electric power output of the electric power storage unit necessary for compensating a delayed response of the power supply section with respect to a variation in the demanded power, an available electric power output calculating section (3) calculating available electric power output of the electric power storage unit on the basis of a stage of charge of the electric power storage unit, and a target power calculating unit (4, 7, 9) calculating target power to be produced by the power supply section on the basis of the demanded drive power, allowable drive electric power output and available electric power output.

20 Claims, 19 Drawing Sheets

VEHICLE CONTROL SYSTEM AND CONTROL METHOD

TECHNICAL FIELD

The present invention relates to a control system and a control method for a vehicle and, more particularly, to a control system and a control method for an electric vehicle or a hybrid vehicle having an electric power generator, an electric power storage unit, and a vehicle drive motor driven by electric power output supplied from at least one of the electric power generator and the electric power storage unit.

BACKGROUND ART

An electric vehicle or hybrid vehicle incorporates not only an electric power storage unit such as a secondary battery unit but also an electric power generator which is driven by a fuel cell or an engine. With such a structure, merely replenishing fuel to the fuel cell or the engine as in a fuel replenishing in a general vehicle allows the electric power generator to be operated with the fuel cell or the engine such that a user is able to preclude a troublesome charging operation for the electric power storage unit per se.

Japanese Patent Application Laid-Open Publication No. H9-222036 discloses an engine control technology to be used in the electric vehicle or the hybrid vehicle which are equipped with the electric power generator and a secondary battery unit. According to such an engine control technology, if a state of charge (SOC) of the secondary battery unit is above a given value and a drive torque command value is less than the maximum torque of a motor, then, the engine is stopped in operation and the motor is driven by electric power output of the secondary battery unit to allow the vehicle to travel.

DISCLOSURE OF INVENTION

However, in such a structure, according to studies conducted by the inventor of the present application, as shown in FIG. 20, there is a difference in a drive torque output to be produced in the vehicle due to a delayed response ΔR in engine start-up in situations between an engine stop condition shown by a line E1 and an engine non-stop condition shown by a line E2. More particularly, in case of the engine stop condition shown by the line E1, there is the delayed response ΔR in operation starting from the engine stop condition to the engine start-up condition to produce a given power output as compared to the engine non-stop condition shown by the line E2, causing a response of a drive torque of the vehicle to be produced by the engine between the engine stop condition shown by a line D1 and the engine non-stop condition shown by a line D2 to be delayed by ΔR. Even when an accelerator pedal is pressed by the same amount of incremental displacement value, there is a difference in response in the drive torque to be produced according to engine operating conditions, with a resultant phenomenon such as a differential feeling to be given to a driver.

Such a phenomenon is similarly supposed to occur in a so-called series hybrid vehicle wherein the electric power generator is driven not only with the secondary battery unit but also with the engine to produce electric power output by which the motor is driven. In particular, as shown in FIG. 21, the presence of the delayed response ΔR' of the electric power generator owing to the engine operation starting from the engine stop condition shown as a line E1' to the engine start-up as compared to the engine non-stop condition shown as a line E2' causes the response of the drive torque of the vehicle to be produced by the motor to be delayed by ΔR' between the engine stop condition shown as a line D1' and the engine non-stop condition shown as a line D2'. As a result, even in the presence of the same degree of accelerator's operation, there is a difference in timing in the response of the drive torque to be produced according to the operating conditions of the engine, providing the phenomenon to cause the driver to have the differential feeling. In addition to the above-described structures, such a phenomenon is also supposed to similarly take place in a fuel cell powered vehicle wherein the fuel cell functions as the electric power generator to produce electric power output for driving the motor, while being provided with the secondary battery.

In order to cope with such situations, particularly, it is thought that, in a structure wherein the vehicle is comprised of the electric power generator, the secondary battery unit and the vehicle drive motor which is driven by electric power output supplied from at least one of the electric power generator and the secondary battery unit, electric power output or a capacity of the secondary battery unit is preset to have a large value so as to cope with power output of the motor. But, such a structure is reflected in an increase in a capacity or weight of the secondary battery unit, with a resultant degraded fuel consuming performance of the vehicle while undesirably causing an inability to efficiently use a volume of a vehicle compartment.

The present invention has been made based on the above studies and has an object to provide a control system and a control method for a vehicle which enables similar qualities of accelerating operation, i.e. similar qualities of torque response characteristic to be obtained at all times to preclude an operating characteristic from being suffered with a differential feeling regardless of the electric power generator operating conditions or the engine operating conditions, such as whether or not an electric power generator or an engine remains in a stop condition, and a capacity of the secondary battery unit.

According to an aspect of the present invention, there is provided a control system for a vehicle having an electric power generator, an electric power storage unit, a drive motor driven by electric power supplied from at least one of the electric power generator and the electric power storage unit, and drive wheels driven by drive power supplied from the drive motor. More specifically, the control system is provided with: a demanded drive power calculating section calculating a demanded drive power required for driving the vehicle; an allowable drive electric power output calculating section calculating allowable drive electric power output of the electric power storage unit required for compensating a delayed response of the electric power generator with respect to a variation in the demanded drive power; an available electric power output calculating section calculating available electric power output of the electric power storage unit to be outputted on the basis of a state of charge of the electric power storage unit, the available electric power output being electric power outputable from the electric power storage unit; and a target electric power output calculating section calculating target electric power output to be produced from the electric power generator on the basis of the demanded drive power, the allowable drive electric power output of the electric power storage unit and the available electric power output of the electric power storage unit. Resultantly, the control system controls the electric power storage unit on the basis of the allowable drive electric power output and the available electric power output, and the electric power generator on the basis of the target electric power output so as to control the vehicle correspondingly to the demanded drive power.

According to another aspect of the present invention, there is provided a control system for a vehicle having an electric power generator, an electric power storage unit, a drive motor driven by electric power supplied from at least one of the electric power generator and the electric power storage unit, and drive wheels driven by drive power supplied from at least one of the engine and the drive motor the drive motor. More specifically, the control system is provided with: a demanded drive power calculating section calculating a demanded drive power required for driving the vehicle; an allowable drive electric power output calculating section calculating allowable drive electric power output of the electric power storage unit required for compensating a delayed response of the electric power generator with respect to a variation in the demanded drive power; an available electric power output calculating section calculating available electric power output of the electric power storage unit to be outputted on the basis of a state of charge of the electric power storage unit, the available electric power output being electric power outputable from the electric power storage unit; a target engine power calculating section calculating a target engine power of the engine on the basis of the demanded drive power, the allowable drive electric power output of the electric power storage unit and the available electric power output of the electric power storage unit; a real engine power calculating section calculating a real power of the engine; a demanded motor drive electric power calculating section calculating demanded motor drive electric power to be supplied to the drive motor on the basis of the demanded power and the real engine power; and a drive motor control section controlling the drive motor in accordance with the demanded motor drive electric power. Resultantly, the control system controls the electric power storage unit on the basis of the allowable drive electric power output and the available electric power output, the engine on the basis of the target engine power, and the drive motor on the basis of the demanded motor drive electric power so as to control the vehicle correspondingly to the demanded drive power.

In other words in the present invention, a vehicle control system is applied to a vehicle having a driving means, and a power supplying means including an electric power storage unit and supplying power output to the driving means. More specifically, the control system is provided with: demanded power calculating means for calculating a demanded drive power required for driving the vehicle; allowable electric power output calculating means for calculating allowable electric power output of the electric power storage unit necessary for compensating a delayed response of the power supplying means with respect to a variation in the demanded drive power; available electric power output calculating means for calculating available electric power output of the electric power storage unit on the basis of a state of charge of the electric power storage unit; and target power output calculating means for calculating target power output to be produced by the power supplying means on the basis of the demanded drive power, the allowable electric power output and the available electric power output. Resultantly, the control system controls the vehicle correspondingly to the demanded drive power on the basis of the allowable drive electric power output, the available electric power output and the target power output.

On the other hand, a vehicle control method of the present invention is applied to a vehicle having a drive section, and a power supply section including an electric power storage unit and supplying power output to the drive section. More specifically, the method calculates a demanded drive power required for driving the vehicle; calculates allowable electric power output of the electric power storage unit necessary for compensating a delayed response of the power supply section with respect to a variation in the demanded drive power; calculates available electric power output of the electric power storage unit on the basis of a state of charge of the electric power storage unit; and calculates target power output to be produced by the power supply section on the basis of the demanded drive power, the allowable electric power output and the available electric power output. Resultantly, the vehicle is controlled correspondingly to the demanded drive power on the basis of the allowable drive electric power output, the available electric power output and the target power output.

Other and further features, advantages, and benefits of the present invention will become more apparent from the following description taken in conjunction with the following drawings.

BEST MODE FOR CARRYING OUT THE INVENTION

To describe the present invention more in detail, preferred embodiments of the present invention will be explained with reference to the drawings below.

First Preferred Embodiment

Figure 1:
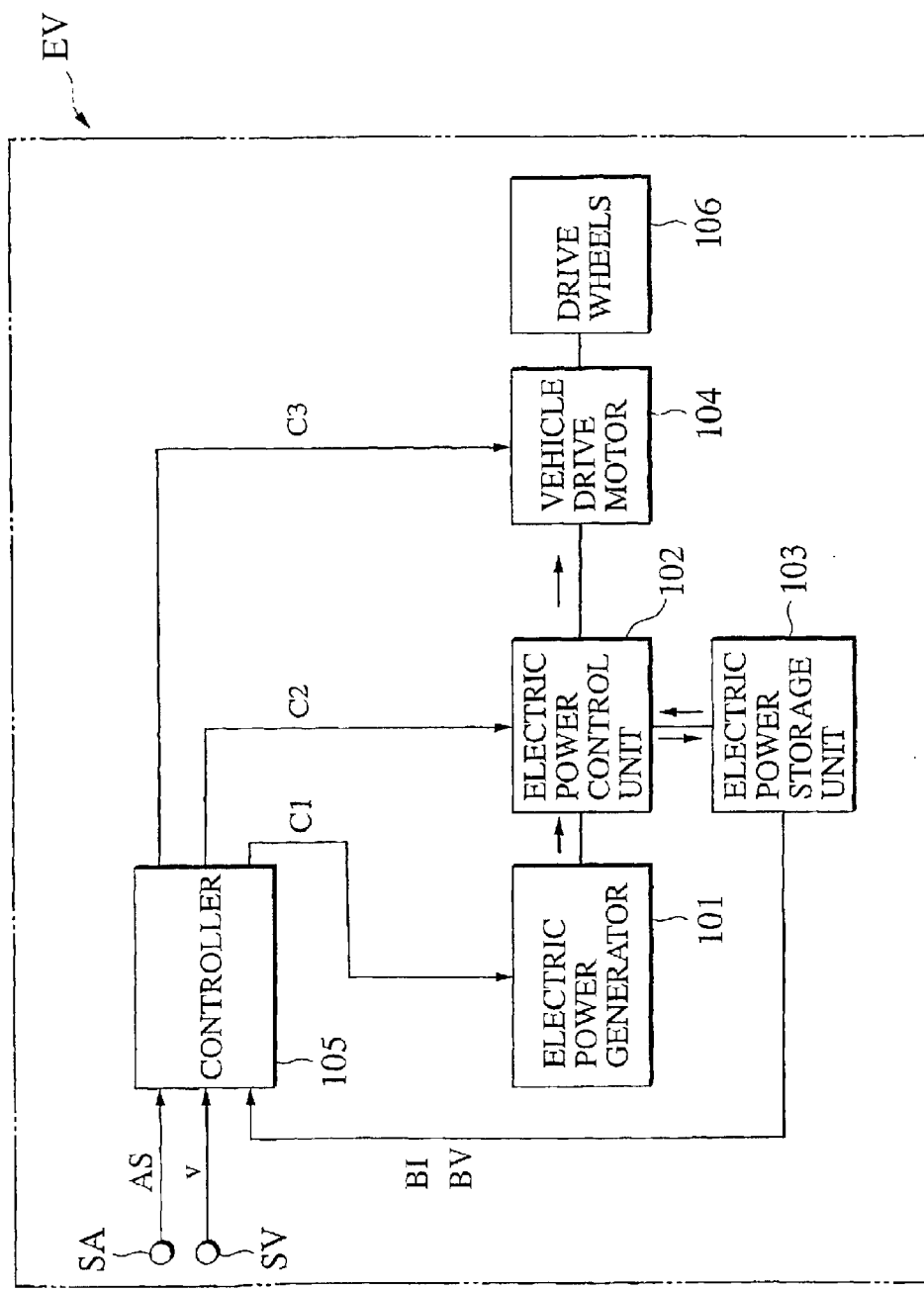
FIG. 1 is a structural view of a vehicle to which a vehicle control system of a first preferred embodiment of the present invention is applied.

FIG. 1 is a structural view of an electric vehicle, which is a typical example of a vehicle to which a vehicle control system of a first preferred embodiment according to the present invention is applied, employing an electric power generator and an electric storage unit. Such a vehicle involves a fuel cell vehicle mounted with a fuel cell which plays a roll as an electric power generator, or a so-called series hybrid vehicle wherein an engine, an electric power generator and an electric motor is mounted in series in a sequence.

In FIG. 1, the vehicle EV is comprised of an electric power generator 101, an electric power control unit 102 which converts electric power generated by the electric power generator 101 into an AC power output or DC power output, an electric power storage unit 103 applied with electric power via the electric power control unit 102 to store the same at an amount equal to the value wherein electric power to be consumed by a vehicle drive motor 104 is subtracted from that produced by the electric power generator 101, the vehicle drive motor 104 driven by electric power supplied via the electric power control unit 102 from at least one of the electric power generator 101 and the electric power storage unit 103, a controller 105 which controls the electric power generator 101, the electric power control unit 102 and the vehicle drive motor 104 on the basis of an accelerator's depressed displacement value AS and a vehicle speed v, and drive wheels 106 driven by the vehicle drive motor 104.

In particular, although the electric power generator 101 may be of any type of an electric power generator, regardless of a particular electric power generation technique, whose electric power output, resultantly electric energy is controllable from the controller 105, the fuel cell or the electric power generator driven by the engine are used as desired electric power generators for the vehicle.

The electric power storage unit 103 is composed of a secondary battery unit, a capacitor, or a so-called flywheel battery wherein a flywheel is coupled to an electric motor generator and stores electric power as a rotational energy of a body in high speed revolution.

The electric power control unit 102 converts electric power generated by the electric power generator 101 or electric power obtained from the electric power storage unit 103 into driving electric power to be applied to a vehicle drive motor 104 and converts excess electric power, which is obtained by subtracting electric power output to be consumed by the vehicle drive motor 104 from electric power output produced by the electric power generator 101. That is, the electric power storage unit 103 is charged by electric power output when the amount of electric power (electric energy) supplied from the electric power control unit 102 is greater than that of electric power consumed by the vehicle drive motor 104 and, in a converse case, discharges electric power output.

The controller 105 is responsive to vehicle conditions such as the accelerator's incremental displacement value AS and the vehicle speed SV and information such as the amount of electric power stored in the electric power storage unit 103 which is based on a discharge current BI, a battery charge voltage BV or the like and can be represented as the state of charge (SOC) of the electric power storage unit 103. Upon receipt of such vehicle conditions and information, the controller 105 operates to calculate a target amount of electric power to be produced, in a manner as will be described below in detail, for producing command signals C1, C2 which are applied to the electric power generator 101 and the electric power control unit 102, respectively, to thereby control power distribution at a given ratio and for producing a command signal C3 which is applied to the vehicle drive motor 104 for controlling drive power of the drive wheels 106.

Figure 2:
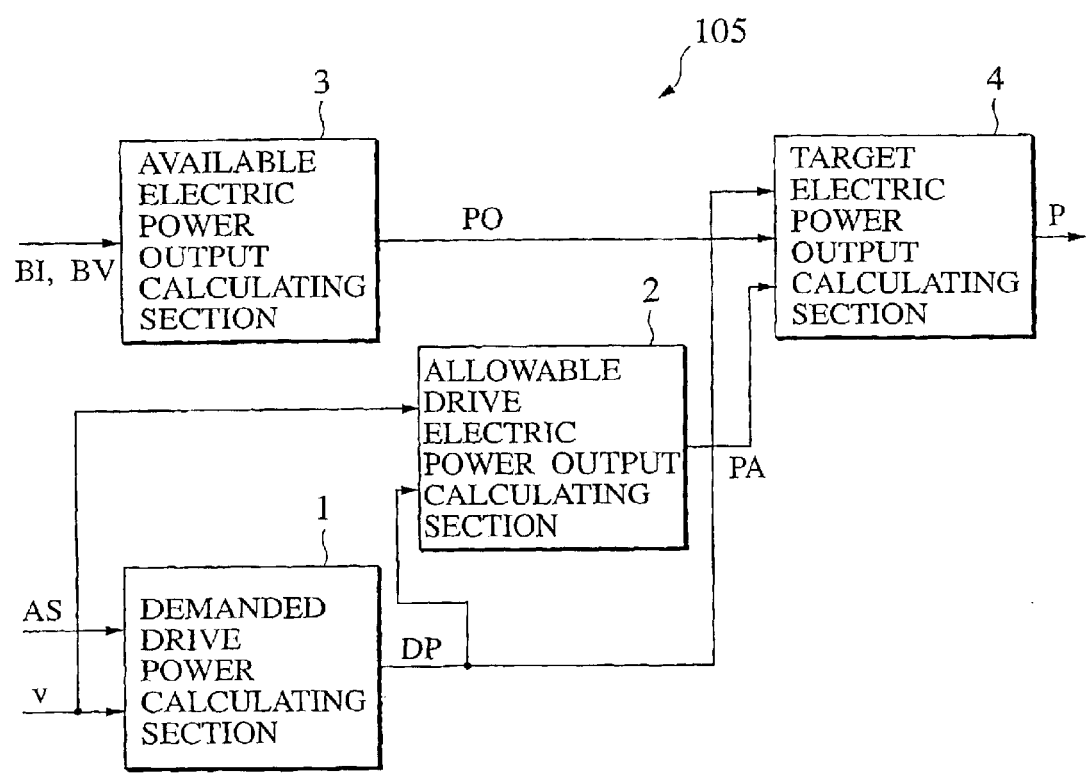
FIG. 2 is a fundamental structural view of the vehicle control system of the first preferred embodiment.

FIG. 2 is a basic structural overview of the controller 105 shown in FIG. 1.

In FIG. 2, the controller 105 is comprised of a demanded drive power calculating section 1 which performs a calculation for a demanded drive power DP which is demanded by the vehicle on the basis of the accelerator's incremental displacement value AS, an allowable drive electric power output calculating section 2 which calculates allowable drive electric power output PA of the electric power storage unit 103 necessary for compensating a delayed response of the electric power generator with respect to variations in the demanded drive power, and an available electric power output calculating section 3 which calculates available electric power output PO of the electric power storage unit 103 to be available from the electric power storage unit 103 on the basis of the state of charge of the electric power storage unit 103 which is based on the discharge current BI, the battery charge voltage BV or the like. More specifically, the available electric power output PO means outputable electric power which is outputable from the electric power storage unit 103. Also a target electric power calculating section 4 which calculates target electric power output P to be produced from the electric power generator 101 on the basis of demanded drive power DP, allowable drive electric power output PA and available electric power output PO.

Figure 3:
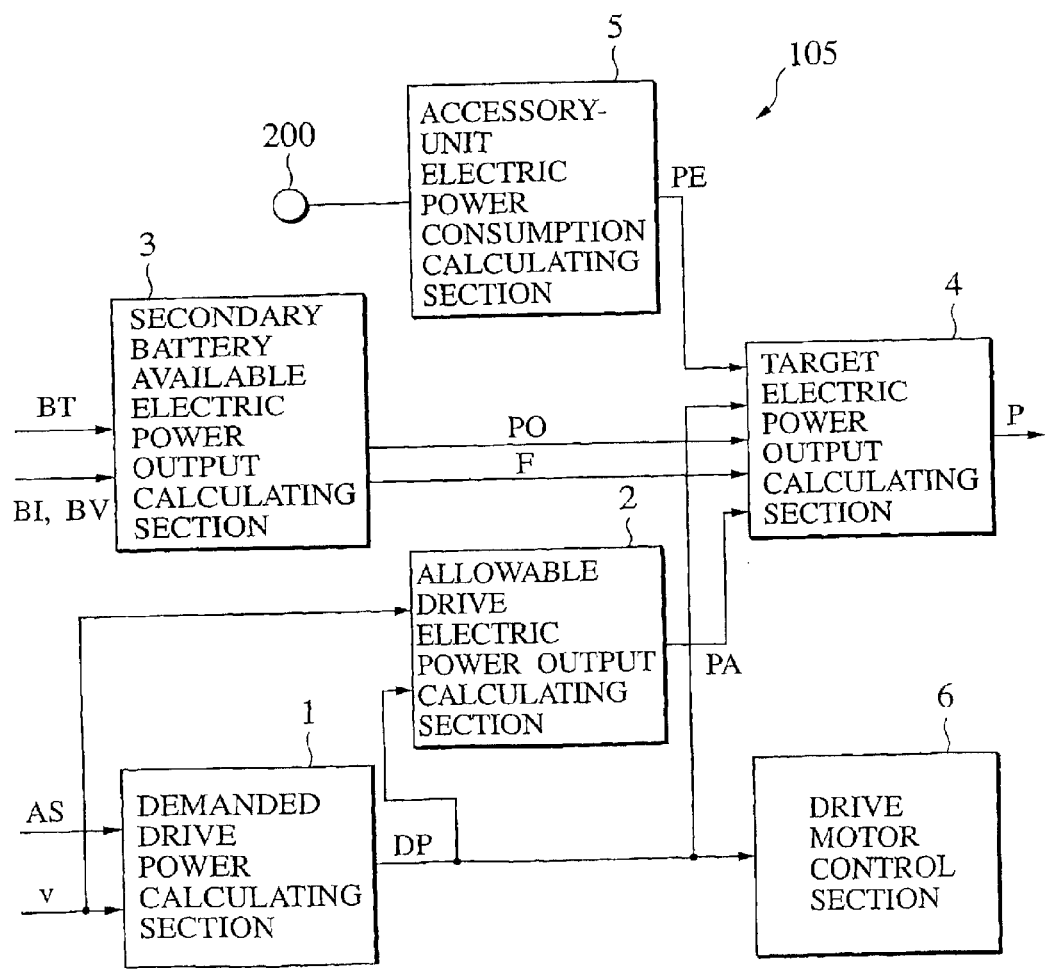
FIG. 3 is a more detailed structural view of the vehicle control system of the first preferred embodiment.

FIG. 3 is a more detailed practical structural overview of the controller 105 shown in FIG. 1.

As shown in detail in FIG. 3, in a practical use, the controller 105 includes an accessory-unit electric power consumption calculating section 5 which estimates or detects accessory-unit electric power consumption PE which is consumed by accessory units (auxiliary equipments) 200 of the vehicle. In the illustrated preferred embodiment, as a matter of convenience, a description will be given to comply with the structure shown in FIG. 3 in conjunction with the electric power storage unit 103 which is composed of a secondary battery unit such as a nickel hydrogen fuel cell and a lithium ion fuel cell, with the temperature BT, discharge current BI and battery charge voltage BV of the secondary battery unit being applied to the controller 105 which is responsive thereto for calculating available electric power output PO to be produced from the secondary battery unit. Further, the controller 105 includes a drive motor control section 6 which controls the drive motor 104 on the basis of demanded drive power DP derived from the demanded drive power calculating section 1.

With such a structure described above, further, the controller 105 also includes the demanded drive power calculating section 1 which calculates the demanded drive power DP which is demanded by the vehicle in response to the accelerator's incremental displacement value AS and the vehicle speed v, the allowable drive electric power output calculating section 2 which calculates allowable drive electric power output PA necessary for compensating the delayed response of the electric power generator 101 with respect to the variations in the demanded drive power DP, the available electric power output calculating section 3 which calculates available electric power output PO, which can be outputted from the electric power storage unit 103, on the basis of the state of charge (BT, BI, BV) of the electric power storage unit (the secondary battery unit) 103, and the target electric power calculating section 4 which calculates target electric power P to be generated from the electric power generator 101. Also, the available electric power output calculating section 3 is so arranged as to deliver a threshold flag information F, indicative of whether the state of charge of the electric power storage unit. 103 is equal to or greater than a given value, which is described below, or is below that value, to the target electric power calculating section 4.

Figure 4:
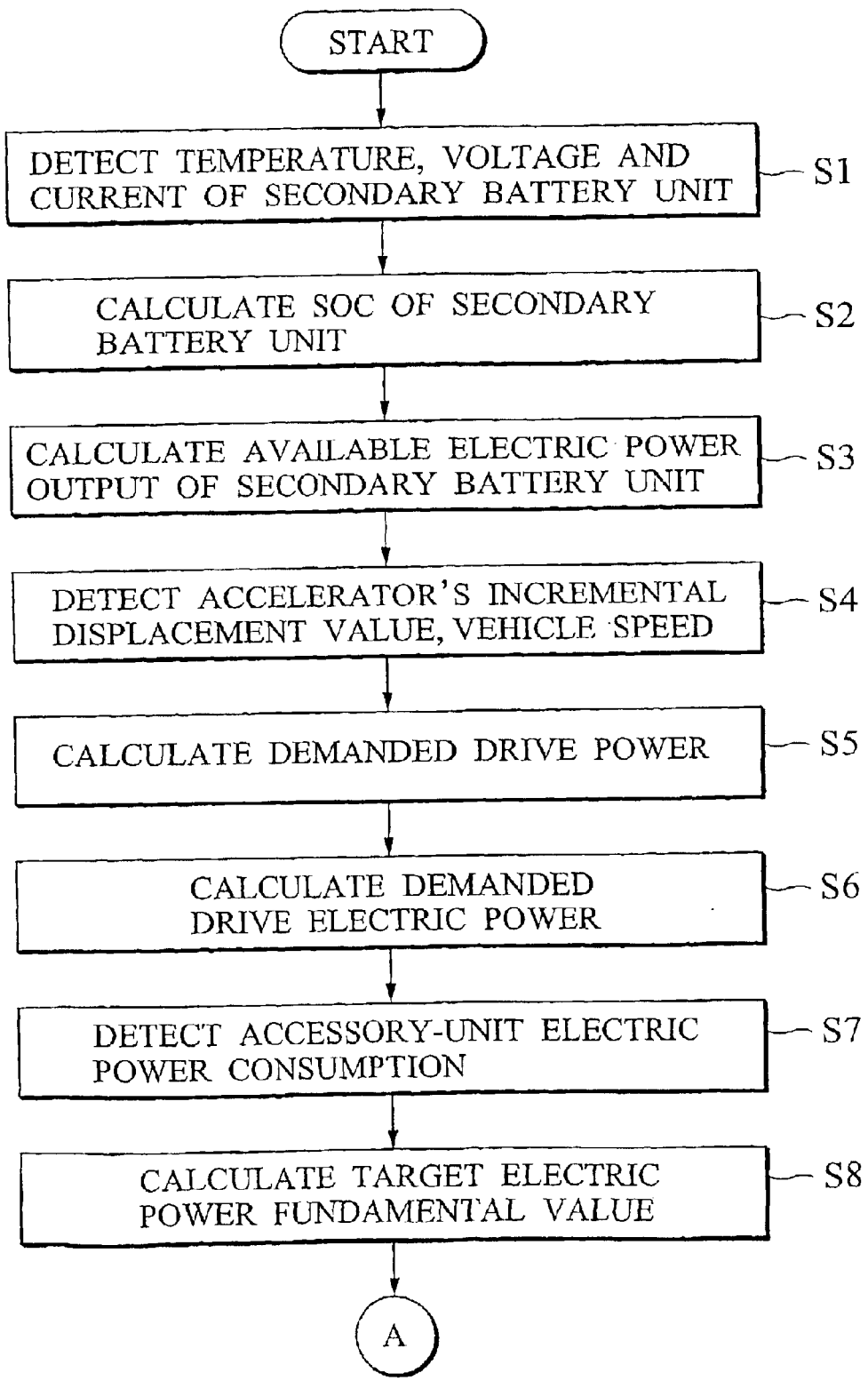
FIG. 4 is a flow chart of a first half illustrating the operation of the first preferred embodiment.
Figure 5:
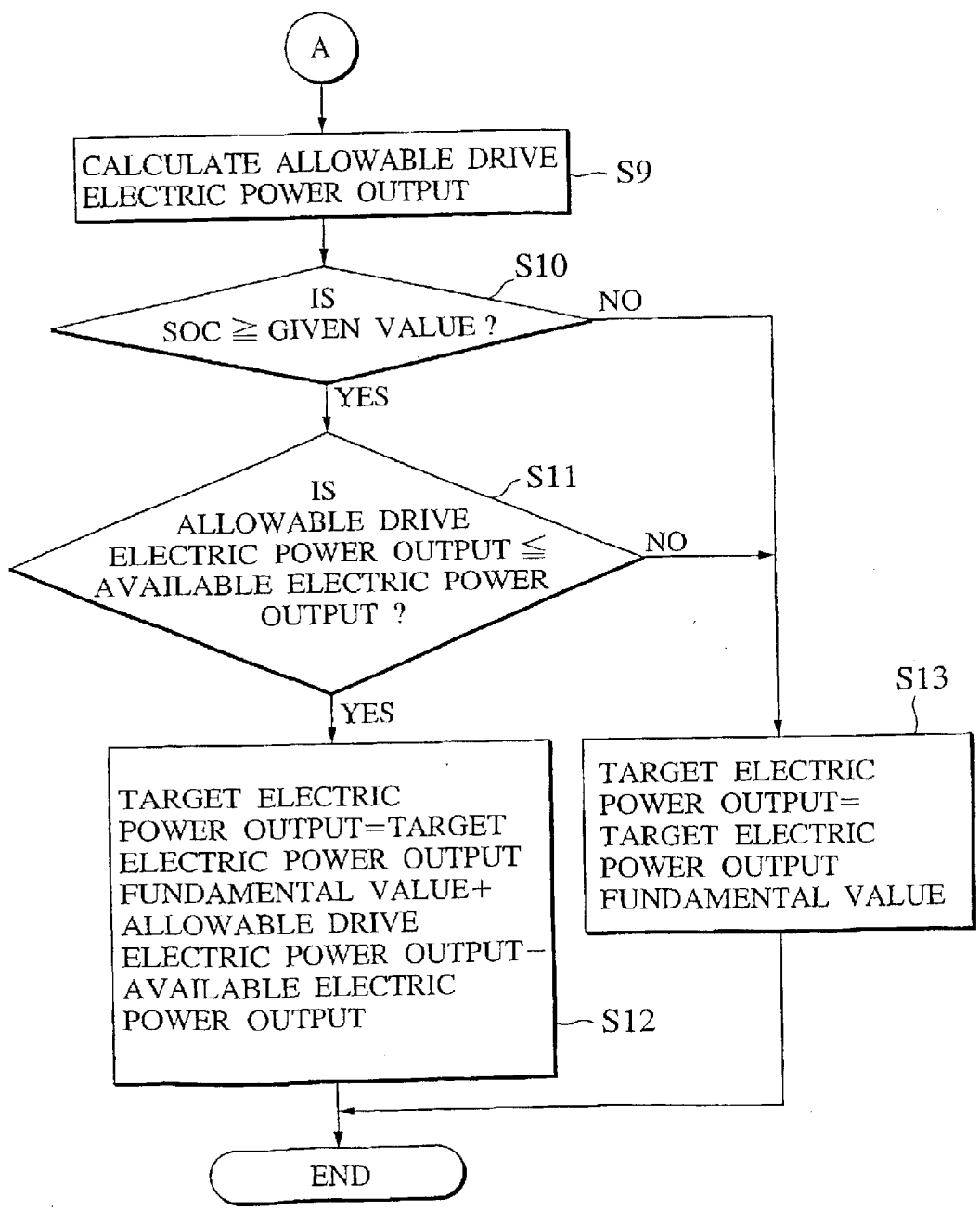
FIG. 5 is a flow chart of a rear half illustrating the operation of the first preferred embodiment.

Now, the operation of the controller 105 shown in FIG. 3 is described below in detail with reference to general flow diagrams of FIGS. 4 and 5. It is to be noted that such an operation will start when an operation key switch (not shown) of the vehicle is turned on.

Initially, in step S1, electric current BI, battery charge voltage BV and the temperature BT of the secondary battery unit 103 are detected.

In consecutive step S2, the state of charge of the secondary battery unit 103 is calculated on the basis of detected results of current BI, battery charge voltage BV and the temperature BT.

Figure 6:
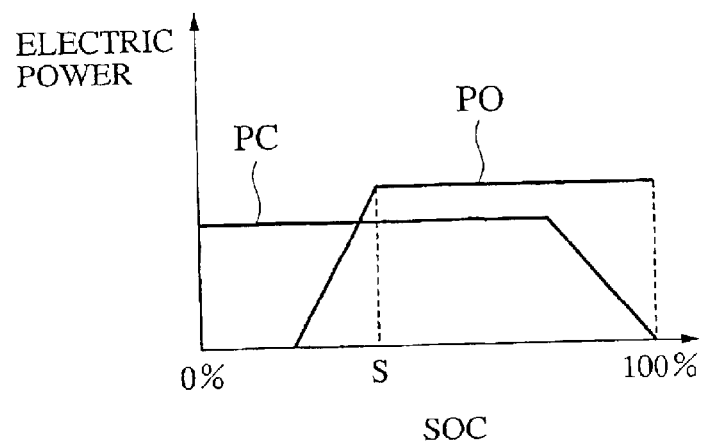
FIG. 6 is a view illustrating a characteristic of a chargeable and dischargeable, available electric power outputs plotted in terms of a state of charge (SOC) of a secondary battery unit forming the first preferred embodiment of the present invention.

In a succeeding step S3, available electric power output PO to be derived from the secondary battery unit 103 is calculated on the basis of the temperature BT of the secondary battery unit 103 and the state of charge calculated in step S2. It is to be noted that available electric power output PO of the secondary battery unit 103 is derived from a chargeable and dischargeable electric power characteristic curve shown in FIG. 6. Such a characteristic is preliminarily stored in a ROM (not shown) of the controller 105. Also, FIG. 6 shows that available electric power output PO traces a substantially fixed level when the state of charge is equal to or greater than a value of S %. Incidentally in FIG. 6, chargeable electric power PC of the secondary battery unit 103 is shown only for reference.

In a subsequent step S4, the accelerator's incremental displacement value AS and the vehicle speed v are detected. If desired, it may be arranged such that shift range information representative of a selected range of a shift lever can be detected.

In consecutive step S5, the controller 105 calculates demanded drive torque, demanded by a vehicle driver, on the basis of operating maps preliminarily stored in the ROM (not shown) of the controller 105 in response to the detected values of the accelerator's incremental displacement value AS and the vehicle speed v and, if desired, in response to shift range information, whereupon the calculator 105 further calculates the demanded drive power DP by multiplying demanded drive torque with the vehicle speed.

In next step S6, the controller 105 performs a correction for the demanded drive power DP, which has been calculated in step S5, taking an efficiency characteristic of the drive motor 103 into consideration. Also, it is to be noted that electric power demanded for the drive motor 103 responsive to the demanded drive power DP refers to demanded drive electric power PD.

In step S7, ON/OFF states of the accessory units 200 are detected and accessory-unit consuming electric power PE is calculated. In such a case, it may be arranged such that electric current and output voltage of a DC/DC converter (not shown) mounted for the accessory units 200 can be detected.

In step S8, target electric power basic value P' is calculated on the basis of calculated results obtained in the above operating steps, using demanded drive electric power PD and accessory-unit consuming electric power PE in accordance with the following formula (1):

$$P'=PD+PE \quad (1)$$

Such a target electric power output basic value P' represents a total sum of electric power output to be consumed.

In a subsequent step S9, allowable drive electric power output PA is calculated.

Here, allowable drive electric power output PA represents electric power which is obtained by subtracting electric power, to be discharged from the secondary battery unit 103 and supplied to the drive motor 104, from available electric power output PO of the secondary battery unit 103.

In other words, allowable drive electric power output PA refers to allowable drive electric power output, which can be available from the secondary battery unit 103 to be supplied to the drive motor 104, taking the delayed response of the electric power generator 101 into account, for achieving the realization of the vehicle driver's demand to perform acceleration of the vehicle without a delay in the demanded drive power DP.

It is difficult to predict when and what is the drive power DP to be used for performing acceleration of the vehicle. Accordingly, in order to realize the drive power demanded by the vehicle driver, allowable drive electric power output PA is of a nature to be enhanced at all times. On the other hand, when the amount of electric power stored in the secondary battery unit 103 is close to a full amount of electric power charging capacity, it is advisable for electric power stored in the secondary battery unit 103 to be consumed to reduce the amount of electric power stored therein both either with a view to eliminating overcharging of electric power or with a view to reducing fuel consumption. While considering about electric power consumption alone allows an idea to use a structure to consume electric power until a full available level of available electric power output PO of the secondary battery unit 103 during a steady state traveling condition, such an idea encounters a situation where, when the vehicle is accelerated from such a steady state traveling condition, allowable drive electric power output PA of the secondary battery unit 103 is nearly close to a substantially zero level, causing a difficulty in compensating the delayed response of the electric power generator with electric power output of the secondary battery unit 103 with a resultant non-response for the drive power demanded by the vehicle driver.

Figure 7A:
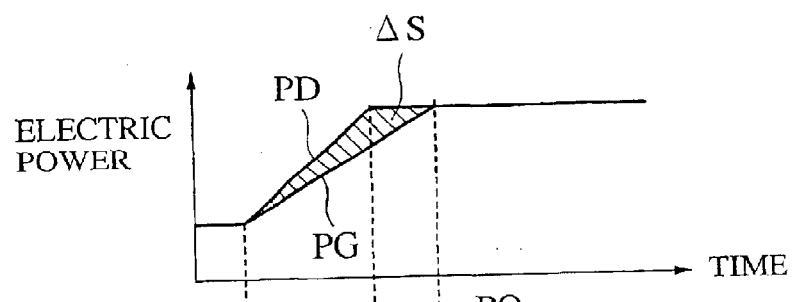
FIG. 7A is a view illustrating electric power output which is in short with respect to a demanded electric power in the first preferred embodiment.
Figure 7B:
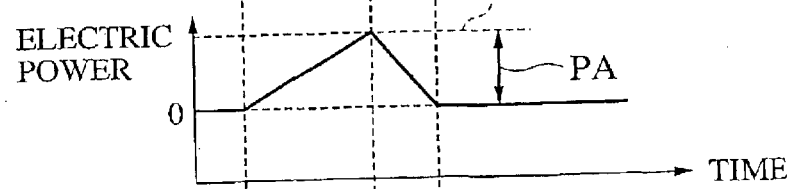
FIGS. 7B and 7C are views illustrating allowable drive electric power outputs of the secondary battery unit plotted in respective patterns in compliance with FIG. 7A.
Figure 7C:
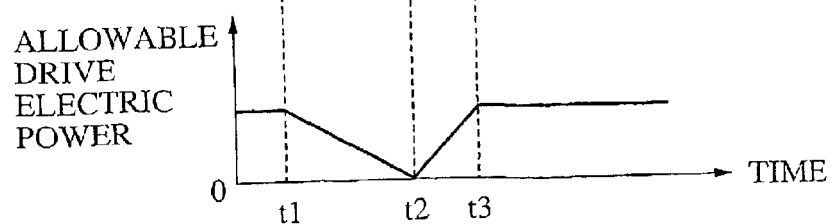

For example, as is generally shown in FIG. 7A, in an event that the driver depresses an accelerator pedal at a time instant t1 to cause the drive motor 104 to be operated with demanded drive power output (motor's electric power consumption) PD for driving the vehicle, if the electric power generator 101 encounters the delayed response and its electric power output PG is insufficient to catch up demanded drive power output PD, then, there is a shortage in demanded drive power output PD to be applied to the drive motor 104 and its shortage electric energy is shown by a hatched area ΔS. In such an event, while the drive motor 104 is supplied with electric power output from the secondary battery unit 103, it is preferable for the drive motor 104 to be supplied with electric power output from the secondary battery unit 103 to make full use of allowable drive power output PA of the secondary battery unit 103 at a time instant t2 where allowable drive power output to be applied to the drive motor 104 remains at the minimum level. FIG. 7B shows such a condition wherein between time intervals t1 and t2, electric power output of the secondary battery unit 103 is applied to the drive motor 104 at a gradually increasing rate from a steady fixed level of allowable drive electric power output PA such that during the time intervals t1 and t2, electric power output of the secondary battery unit 103 is decreased while gradually approaching to the value corresponding to the steady fixed level of allowable drive electric power output PA of the secondary battery unit 103. Also, during time periods prior to the time instant t1 and aft the time instant t2, when presetting that allowable drive electric power output PA is nearly equal to the available electric power output PO, allowable drive electric power output PA tends to be enhanced to have a margin to enable electric power output to be discharged at the maximum rate. On the other hand, during such time periods, the secondary battery unit 103 encounters a difficulty in discharging electric power output. In general, since the amount of stored electric power remains in a full charged state, it is difficult for the secondary battery unit 103 to be further charged with electric power with a consideration not to cause overcharging of the same. FIG. 7C shows how allowable drive power output is varied in terms of elapsed times, with allowable drive electric power output PA being plotted in the axis of ordinates.

In the illustrated preferred embodiment, in order to realize a response of the drive power demanded by the vehicle driver, it is advisable to preset a basic concept in that electric power output of the secondary battery unit 103 is used at a level as high as possible during the steady state traveling condition of the vehicle, when the amount of electric power stored in the secondary battery unit 103 remains in its fully charged rate, while enhancing the amount of electric power necessary for the secondary battery unit 103.

In such a study, initially, the present preferred embodiment is carried out by supposing that the simplest technology has been undertaken to preliminarily conduct searches for the characteristic of the demanded drive power DP of the drive motor 104, that is, the characteristic of demanded drive electric power PD and the electric power generating characteristic of the electric power generator 101, with a view to enhancing the maximum allowable discharging capacity of the secondary battery unit 103, with searched results having the maximum value (which remains at a fixed value lower than available electric power output PO by a given amount) that represents allowable drive electric power output PA in the steady state traveling mode. In addition to such supposition, this value is preliminarily stored in the ROM (not shown) in the controller 105 and is suitably referred to for being read out in a subsequent process.

In a subsequent step S10, it is discriminated on the basis of a SOC threshold value flag information F whether the state of charge of the secondary battery unit 103 exceeds the given value or is below the same. In particular, if the state of charge is equal to or greater than the value of S % as shown in FIG. 6, since available electric power output PO remains at the fixed value, it is discriminated whether the state of charge is equal to or greater than the value of S %. Of course, if desired, it may be possible to use a further lower threshold value for executing the discriminating step.

In step S10, when the discrimination shows that the state of charge is equal to or greater than the given value, the operation goes to step S11 where a comparison is made between allowable drive electric power output PA of the secondary battery unit 103 and available electric power output PO. That is, it is discriminated whether or not allowable drive electric power output PA is below available electric power output PO.

In step S11, normally, since it has been confirmed in step S10 that the state of charge is equal to or greater than the given value, i.e. typically the value of S %, it is discriminated that the allowable drive electric power output PA is below available electric power output PO whereupon in step S12, target electric power output P is calculated in the following formula (2) using allowable drive electric power output PA and available electric power output P of the secondary battery unit 103:

$$P=P'-(PO-PA)=P'+PA-PO \qquad (2)$$

This means that the electric power generator 101 operates to generate electric power output under a condition where a value corresponding to a difference between available electric power output PO of the secondary battery unit 103 and allowable drive electric power output PA is subtracted from a target electric power output basic value P' representative of the total electric power output to be consumed by the vehicle. In other words, such a condition represents that the secondary battery unit 103 operates to discharge electric power output at the value of the difference between available electric power output PO of the secondary battery unit 103 and allowable drive electric power output PA. Then, the current operation is terminated and the operation is repeatedly executed at given time intervals until the ignition key of the vehicle is turned off.

In contrast, when it is judged in step S10 that the state of charge is below the given value, or when it is judged in step S11 that allowable drive electric power output PA, which has been preliminarily preset, is greater than available electric power output PO because of some reasons such as those wherein the SOC threshold value has been settled to a lower value, in step S13, target electric power output P is calculated in the following formula (3) using the target electric power output basic value P':

$$P = P' \tag{3}$$

This means that the electric power generator 101 operates to generate all the amount of electric power output corresponding to the target electric power output basic value P' representative of the whole amount of electric power consumed by the vehicle and, as a result, the secondary battery unit 103 terminates its discharging operation. Then, the current operation is terminated and the operation is repeatedly executed at given time intervals until the ignition key of the vehicle is turned off.

Now, the operation of the above steps is described below in more detail in conjunction with FIG. 8.

Figure 8:
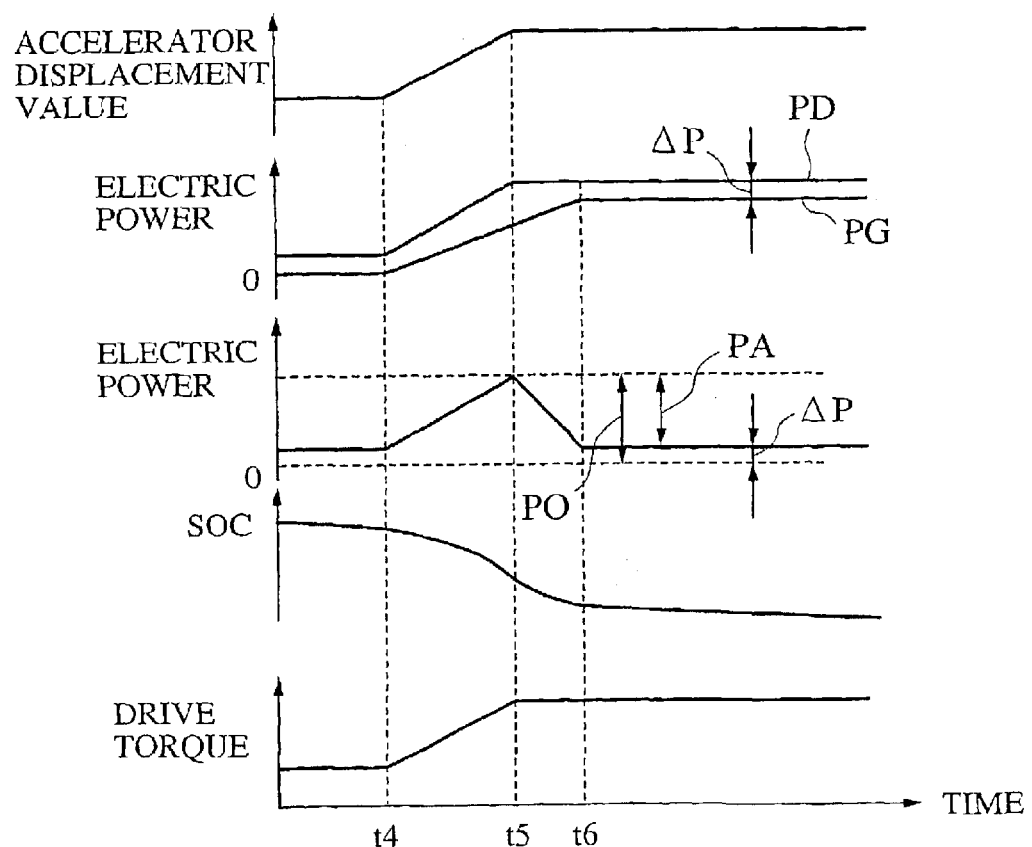
FIG. 8 is a view illustrating electric power output of an electric power generator, electric power output of the secondary battery unit, the state of charge (SOC) of the secondary battery unit, and drive torque, in a sequential manner, of the first preferred embodiment in a case where an accelerator is operated.

In FIG. 8, the output of the electric power generator 101, the output of the secondary battery unit 103, the state of charge and the drive torque are plotted in terms of time in a case where the accelerator pedal remains at the fixedly depressed condition and is further depressed during a time period between t4 to t5 with a subsequent accelerator position remaining at the previously depressed state after a time instant t5.

In FIG. 8, in a time period prior to the time instant t4 at which the accelerator pedal is further depressed, the secondary battery unit 103 is settled such that allowable drive electric power output PA indicative of the steady state value has the maximum value among those supposed for accelerating conditions of the vehicle speculates to allow the secondary battery unit 103 to discharge electric power output for leaving a remaining charge capacity whereby a value ΔP representative of a difference between available electric power output PO of the secondary battery unit 103 and allowable drive electric power output PA is discharged from the secondary battery unit 103 and supplied to the drive motor 104. Here, electric power output of the electric power generator 101 remains at "0" level. In this instance, demanded drive electric power PD of the drive motor 104 is entirely supplied from the secondary battery unit 103 and concurrently allowable drive electric power output PA is sufficiently enhanced even when the accelerator is depressed after the time instant t4. Then, during the time period between t4 and t5, the secondary battery unit 103 may discharge electric power output at the maximum level of available electric power output PO utilizing allowable drive electric power PA to the fullest. That is, it is possible for a short of electric power output to be compensated because of the delay in response of the electric power generator with respect to the demanded drive electric power PD to be compensated, with a resultant realization of the response of desired drive electric power (i.e. the drive torque). During a time period after t5, the value ΔP representative of the difference between available electric power output PO of the secondary battery unit 103 and allowable drive electric power output PA is discharged from the secondary battery unit 103% allowing a shift to the steady state operation to cause the difference between electric power output of the electric power generator 101 and demanded drive electric power PD of the drive motor 104 to be compensated. Here, as a convenience, a description has been given in conjunction with a condition wherein, in the time periods prior to t4 and after t5, the amounts of electric power output supplied from the secondary battery unit 103 are treated to have the same ΔP.

Figure 9:
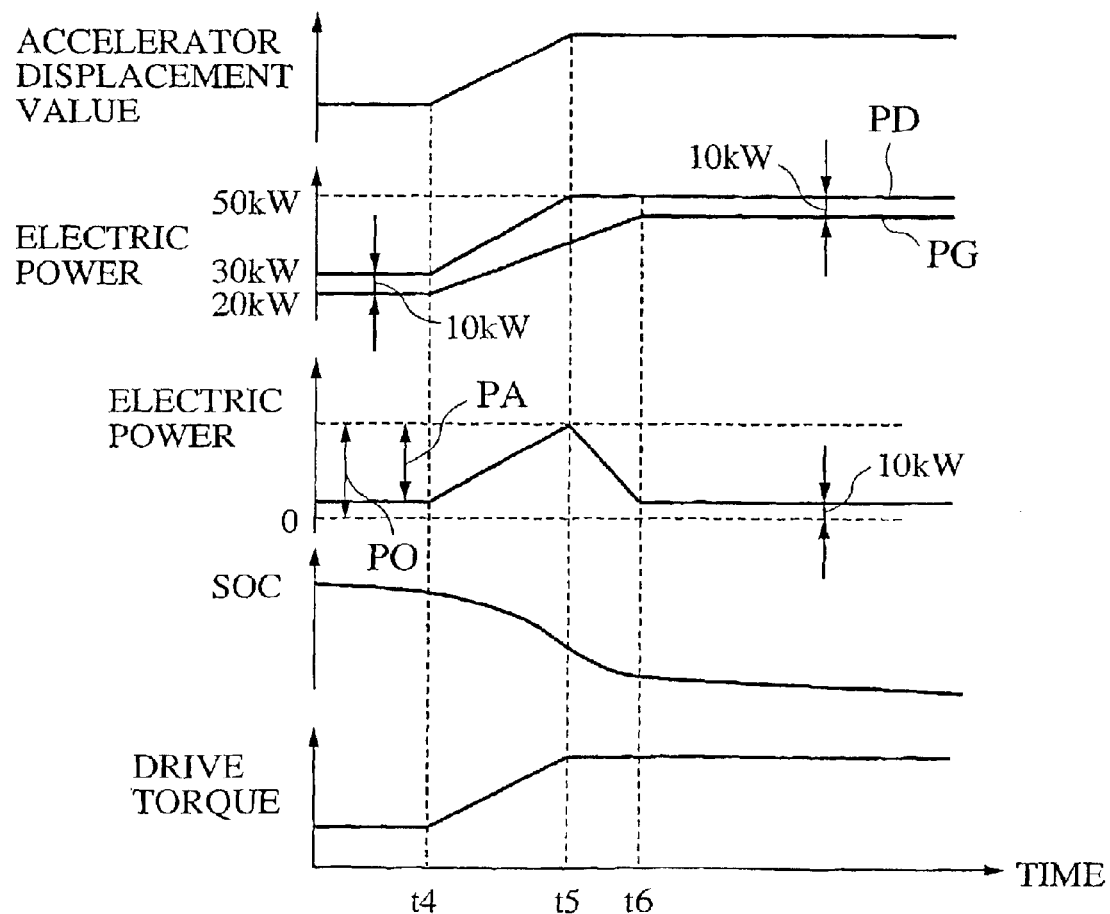
FIG. 9 is a view illustrating electric power output of an electric power generator, electric power output of the secondary battery unit, the state of charge (SOC) of the secondary battery unit, and drive torque, in a sequential manner, of the first preferred embodiment in a case where an accelerator is operated.

Next, a detailed description is given to a case example where electric power output of the electric power generator 101 is not zero in the time period prior to the time instant t4 with reference to FIG. 9, using detailed numeric values.

In FIG. 9, it is supposed that allowable drive electric power output PA during the steady state operation, representative of the maximum value among those selected during the accelerating conditions of the vehicle, is settled to have a value of 20 kW and that the vehicle is presumed to perform acceleration to cause demanded drive electric power PD to be varied from 30 kW to 50 kW during the time period between t4 and t5. Here, assuming that available electric power output PO of the secondary battery unit 103 is 30 kW, in a condition prior to the acceleration at t4, the electric power generator 101 is caused to operate for producing electric power output of 20 kW which is a result that is obtained by subtracting a value of 10 kW, derived by subtracting allowable drive electric power output PA of 20 kW from available electric power output of 30 kW of the secondary battery unit 103, from drive electric power output of 30 kW prior to the acceleration. When this occurs, the secondary battery unit 103 produces electric power output of 10 kW, representative of the shortage of electric power output produced by the electric power generator 101, as complementary electric power output to be supplied with respect to demanded drive electric power which is electric power consumption. During the accelerating period from t4 to t5, in addition to electric power output of 10 kW which is in short of, the shortage of electric power output caused by the delayed response of the electric power generator 101 with respect to the response of demanded drive electric power PD is added. Such a shortage in electric power output corresponds to the maximum value of 20 kW supposed to be the maximum value for the accelerating conditions and never exceed the value of 20 kW. That is, the secondary battery unit 103 discharges electric power output within a limited value of no more than 30 kW which is available electric power output PO. Even when the acceleration is terminated at t5 and the vehicle is shifted to the normal steady state operation with demanded drive electric power PD of 50 kW remaining in the time period subsequent to t6, the controller executes the same operation as that performed during the driving condition prior to the acceleration at t4, resulting in the operation of the electric power generator 101 which produces electric power output of 40 kW while causing the secondary battery unit 103 to discharge electric power output of 10 kW.

Now, in the foregoing description, it is supposed that allowable drive electric power output PA, in the steady state condition where the vehicle is not accelerated by the accelerator remaining at the fixedly depressed displacement value, is settled as the maximum value with a view to permitting the secondary battery unit 103 to have the maximum allowable discharging capacity.

Even in such a settlement, it is possible to realize the response of the desired drive electric power (i.e. the resulting drive torque). However, when settling is implemented so as to ensure allowable drive electric power output PA at its maximum value, in an actual practice, because allowable drive electric power output PA is ensured at the maximum value, it may be thought that there is a few chance to cause the secondary battery unit 103 to perform the discharging operation or the amount of electric power to be discharged from the secondary battery unit 103 remains at a small value.

Figure 10A:
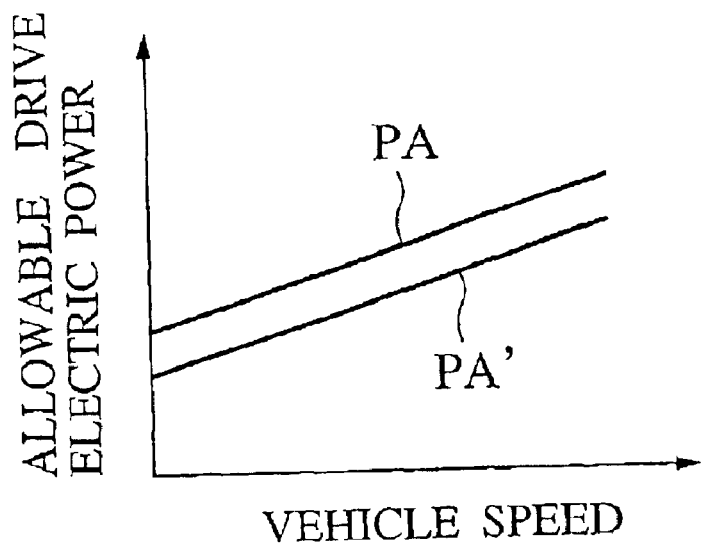
FIGS. 10A and 10B are views illustrating preset examples of the allowable drive electric power output of the electric power storage unit plotted in terms of a vehicle speed of the first preferred embodiment.
Figure 10B:
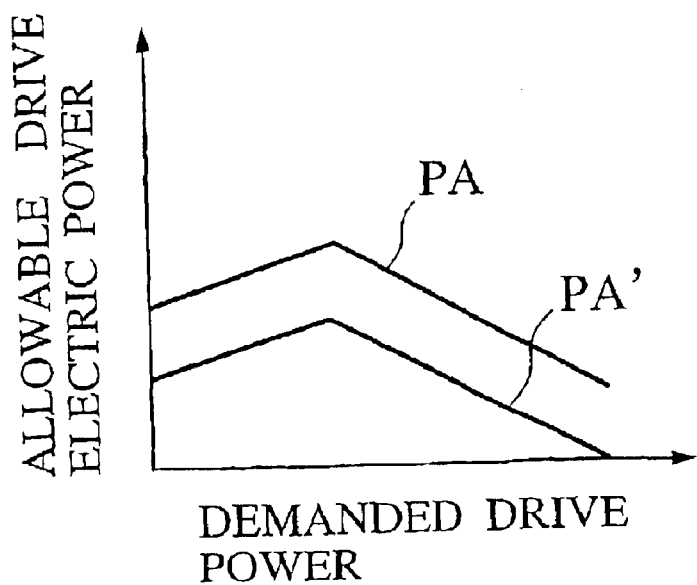

To this end, it is thought that, as shown in FIG. 10A, allowable drive electric power output is suitable settled in dependence on the vehicle speed and, as shown in FIG. 10B, allowable drive electric power output is settled in dependence on the demanded drive power.

Figure 11:
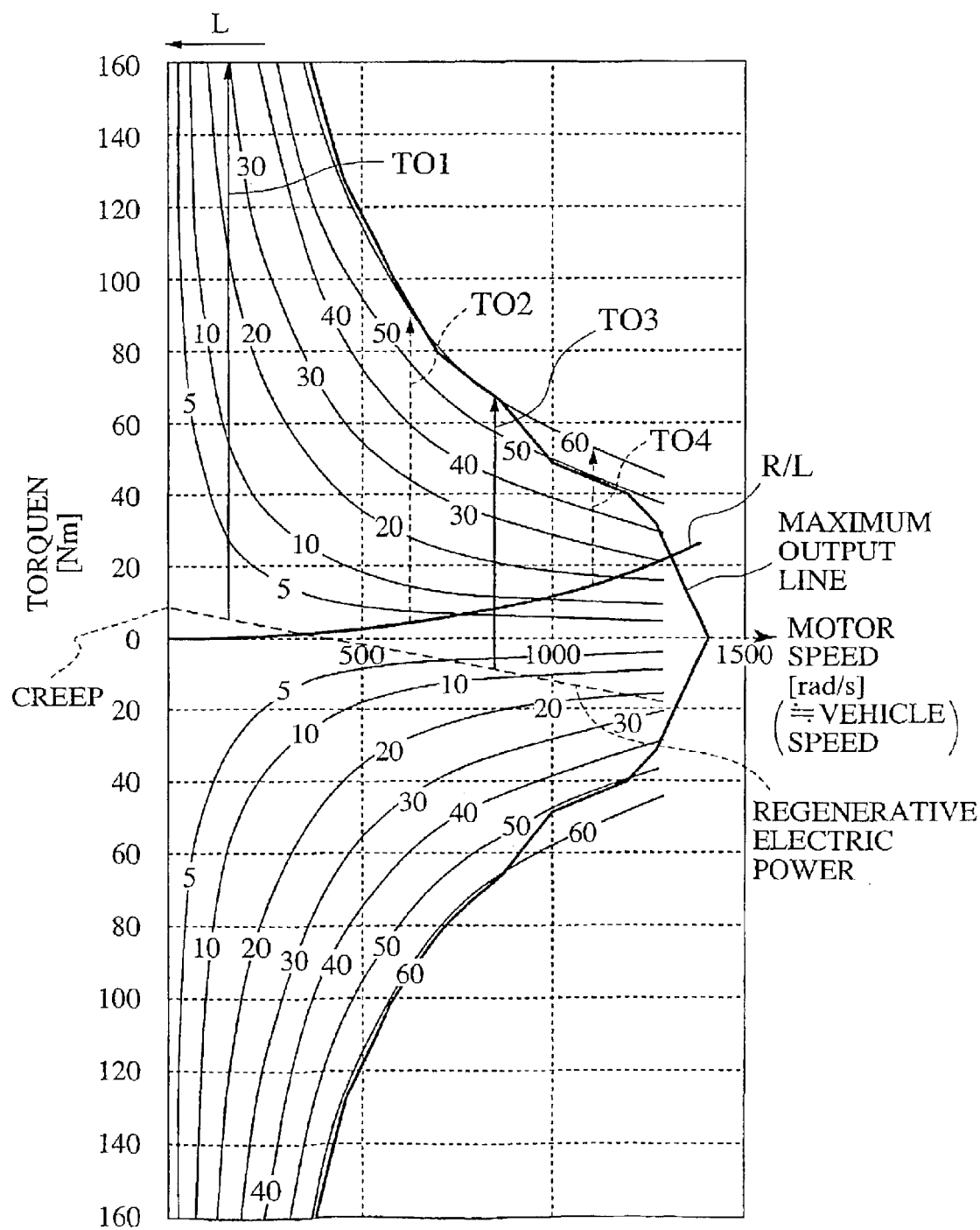
FIG. 11 is a view illustrating examples of characteristic of a drive motor of the first preferred embodiment.

More particularly, a study is conducted for the operating characteristic of the drive motor 104 in terms of the traveling resistance (R/L) with reference to FIG. 11. Also, in FIG. 11, a motor's rotational speed (≈ vehicle speed) is plotted on the abscissa axis, and the motor torque is plotted on the ordinates axis, with contour lines representing an output power of the motor.

In FIG. 11, with reference to values along lines TO1 to TO4, it appears that when the vehicle speed is at a low value, that is, when the rotational speed of the drive motor 104 remains at a low value as shown by an arrow L, there is a large variation in torque with less variation in the output power of the motor. This means that the amount of variation in the output power of the motor 104 during the accelerating operation which is originally supposed and that allowable drive electric power output PA to be preset may have a small value. As a result, at a low vehicle speed as seen in FIG. 10A, it is settled that allowable drive electric power output PA has a lower value than the maximum value that is supposed as previously discussed above and is gradually increased with an increase in the vehicle speed. Then, determining allowable drive electric power output PA, which varies over time, with a consideration of the response speed of the electric power generator 101 taken into account enables an increase in the number of chances or the amount of discharged electric power of the secondary battery unit 103 as compared to the maximum value of allowable drive electric power output PA supposed in the steady state operation of the vehicle. This leads to an increase in the number of chances or the amount of electric power discharged from the secondary battery unit 103 even in the event that the state of charge is below the value of S % and available electric power output PO remains at a lower value than the fixed value shown in FIG. 6.

During a middle and high speed ranges, since the vehicle is not only just coasting but is also traveling against the force of the traveling resistance (R/L), as the vehicle is shifted to the accelerated condition, the demanded drive power DP of the vehicle, that is, demanded drive electric power PD of the drive motor 104 is caused to vary in a large value while, on the other hand, the maximum output per se of the drive motor 104 is originally determined. With such a view in mind, as seen in FIG. 10B, allowable drive electric power output PA in the steady operating state of the vehicle may be settled on the basis of demanded drive power DP corresponding to the motor output of the drive motor 104, that is, demanded drive electric power PD and, even in such a case, it is possible for the secondary battery unit 103 to have an increased number of discharging operations an increased amount of electric power to be discharged. That is, allowable drive electric power output PA may be settled such that it is gradually increased under a condition where the allowable drive electric power output is below the maximum demanded drive power DP, that is, demanded drive electric power PD corresponding to the maximum output of the drive motor 104 and is gradually decreased under another condition where the allowable drive electric power output exceeds the maximum demanded drive power.

Also, when taking a stopped state of the electric power generator 101 in operation into a consideration, since a more time is elapsed than that required in a non-stopped state of the electric power generator 101 in operation until a desired amount of electric power is produced by the electric power generator 101 starting from the stopped state of the same, it is preferred that allowable drive electric power output PA at the stopped state of the electric power generator 101 is settled to have a value added by a given value relative to allowable drive electric power output PA' that settled in the non-stopped state of the electric power generator 101. Also, it may be possible for either small one of allowable drive electric power output PA, PA' defined as shown in FIG. 10A and allowable drive electric power output PA, PA' as defined in FIG. 10B to be selected.

Such an operation is described below in detail with reference to FIG. 12.

Figure 12:
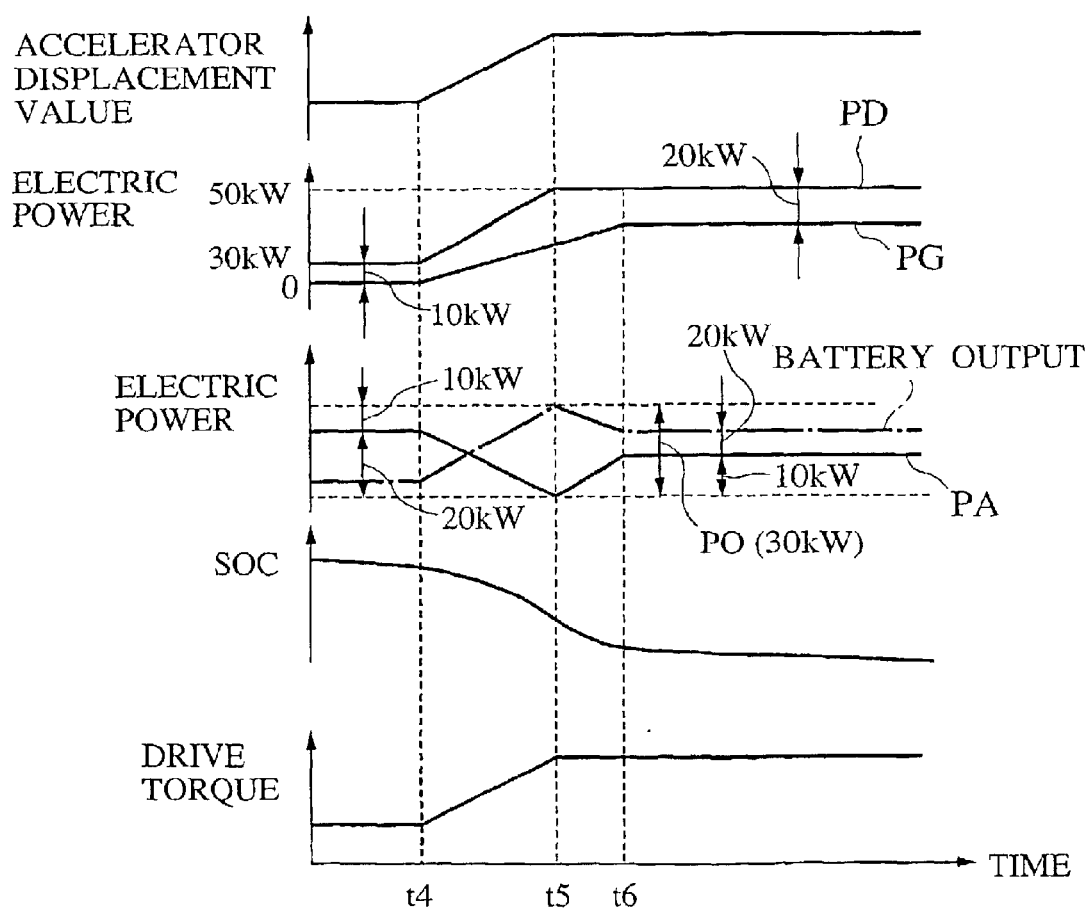
FIG. 12 is a view illustrating electric power output of an electric power generator, electric power output of the secondary battery unit, the state of charge (SOC) of the secondary battery unit, and drive torque, in a sequential manner, of the first preferred embodiment in a case where an accelerator is operated.

FIG. 12 shows the accelerating condition of the vehicle under a condition where the demanded drive electric power varies from a value of 30 kW to 50 kW in a time period between t4 and t5. Here, it is supposed that the allowable drive electric power output PA is settled to have the values of 20 kW and 10 kW at the values of demanded drive electric power being set to 30 kW and 50 kW, respectively, while taking the response of the electric power generator 101 into consideration. Also, it is assumed that power output of the drive motor 104 has the maximum value of 60 kW and available electric power output PA of the secondary battery unit 103 is set to a value of 30 kW. During the time period prior to the accelerating condition at t4, the electric power generator 101 is caused to operate for producing electric power output of 20 kW which is a result that is obtained by subtracting a value of 10 kW, derived by subtracting allowable drive electric power output PA of 20 kW from available electric power output of 30 kW of the secondary battery unit 103, from demanded drive electric power PD of 30 kW prior to the acceleration. When this occurs, the drive motor 104 is supplied with electric power output of 10 kW, which corresponds to the shortage in the electric power output of the electric power generator 101 to be produced for demanded drive electric power PD which is electric power consumption. During the accelerating condition between the time instants t4 and t5, the drive motor 104 is supplied with electric power output of 10 kW corresponding to the shortage in electric power and, in addition thereto, with electric power output, which corresponds to the shortage in electric power caused by the delayed response of the electric power generator 101 with respect to the response of demanded drive electric power PD, supplied from the secondary battery unit 103. In this instance, since allowable drive electric power output PA is settled to have the value of 20 kW which is preset on the supposition in that demanded drive electric power is 30 kW, the drive motor 104 is supplied with electric power output, from the secondary battery unit 103, at the value of no more than 30 kW which is the maximum value of available electric power output PO. During the time period after the time instant t5, the acceleration is terminated and, in the steady state operation with demanded drive electric power PD of 50 kW, the electric power generator 101 operates to produce electric power output of 30 kW representative of a value obtained by subtracting allowable drive electric power output PA of 10 kW from available electric power output PO of 30 kW of the secondary battery unit 103 to provide a result of 20 kW and subtracting the same from demanded drive electric power PD of 50 kW. When this occurs, the secondary battery unit 103 produces electric power output of 20 kW corresponding to the shortage in electric power output of the electric power generator 101 to be supplied in response to demanded drive electric power PD which is electric power consumption. Incidentally, electric power output from the secondary battery unit 103 is shown by a dashed line in FIG. 12.

Thus, presetting allowable drive electric power output PA on the basis of the vehicle conditions to compel allowable drive electric power output PA to be used for controlling outputs of the electric power generator 101 and the secondary battery unit 103 enables the number of frequencies or the amount of outputs to be produced by the secondary battery unit 103 to be increased as compared to the case where allowable drive electric power output PA is settled to have the maximum value among the accelerating conditions which are supposed as the vehicle.

In the preferred embodiment described above, since the vehicle control system, which includes the electric power generator, the electric power storage unit, the drive motor driven by electric power output delivered from at least one of the electric power generator and the electric power storage unit, the drive wheels driven by drive power output delivered from the drive motor, is comprised of the demanded drive power calculating section which calculates the demanded drive power demanded for driving the vehicle, the allowable drive electric power output calculating section which calculates allowable drive electric power output necessary for compensating the delay in response of the electric power generator with respect to the variation in the demanded drive power, the available electric power output calculating section which calculates available electric power output of the electric power storage unit on the basis of the state of charge of the electric power storage unit, and the target electric power calculating section which calculates target electric power output to be produced from the electric power generator on the basis of the demanded drive power, allowable drive electric power output and available electric power output of he electric power storage unit, the vehicle control system is effective for controlling the amount of electric power output to be produced while leaving allowable drive electric power output necessary for the accelerating operation of the vehicle.

Also, the presence of the target electric power output amount calculating section, which is arranged to determine target electric power by subtracting a value, obtained by subtracting allowable drive electric power output from available electric power output of the electric power storage unit, from demanded drive electric power of the drive motor in response to the demanded drive power when the amount of electric power stored in the electric power storage unit is equal to or greater than the given value and available drive electric power is equal to or greater than the allowable drive electric power output, enables the electric power storage unit to reliably store allowable drive electric power output at all times at an amount necessary for executing the accelerating operation regardless of the stop or operating conditions of the electric power generator and the capacity of the electric power storage unit. Further, if the amount of electric power stored in the electric power storage unit is equal to or greater than the given value, the electric power storage unit may discharge electric power output in a positive manner. This results in a capability for effectively precluding the electric power storage unit from being overcharged. Since, further, electric power stored in the electric power storage unit is positively used when the amount of electric power stored in the electric power storage unit exceeds the given value, improved fuel consumption is expected.

Furthermore, the presence of the accessory-unit consuming electric power calculating section which obtains electric power consumption of the accessory units of the vehicle allows the target electric power output calculating section to determine target electric power output, to be produced, by subtracting a value, obtained by subtracting allowable drive electric power output from available electric power output of the electric power storage unit, from a value obtained by adding accessory-unit electric power consumption to demanded drive electric power of the drive motor, which corresponds to the demanded drive power, when the amount of electric power stored in the electric power storage unit is equal to or greater than the given value and available electric power output of the electric power storage unit is equal to or greater than allowable drive electric power output. As a consequence, the vehicle control system performs the control of the amount of electric power to be produced in a more precise manner while permitting allowable drive electric power output to remain for the accelerating operation of the vehicle.

In addition, since the allowable drive electric power output calculating section calculates allowable drive electric power output on the basis of at least one of the vehicle speed and the demanded drive power, it is possible for demanded allowable drive electric power output to be calculated in accordance with the vehicle conditions, resulting in an increase in the number of frequencies or the amount of electric power to be produced by the electric power storage unit for thereby improving fuel consumption.

Further, since the allowable drive electric power output calculating section is arranged to select a small one of first allowable drive electric power output determined in response to the vehicle speed and second allowable drive electric power output determined in response to the demanded drive power, it is possible to calculate demanded allowable drive electric power output in accordance with the operating characteristic of the drive motor, the preset demanded drive power characteristic and the vehicle conditions.

Also, if the electric power generator is comprised of the fuel battery cell, there is no exhaust emission of the engine, with a resultant capability in providing a vehicle having highly improved fuel consumption. In addition, if the electric power generator is arranged to be driven by the engine, it is possible to provide a vehicle having an improved drive torque response.

Second Preferred Embodiment

Now, a detailed description will be given to a vehicle control system of a second preferred embodiment of the present invention which is able to stop the operation of the electric power generator 101 at a given instance.

The vehicle control system of the second preferred embodiment has the same structure as that of the first preferred embodiment and, therefore, a detailed description of the same is herein omitted. Also, the vehicle control system of the second preferred embodiment executes the same steps up to step S8 shown in FIG. 4 and, thus, a detailed description of these steps is herein omitted except for remaining steps which will be discussed with reference to a flow chart of FIG. 13.

Figure 13:
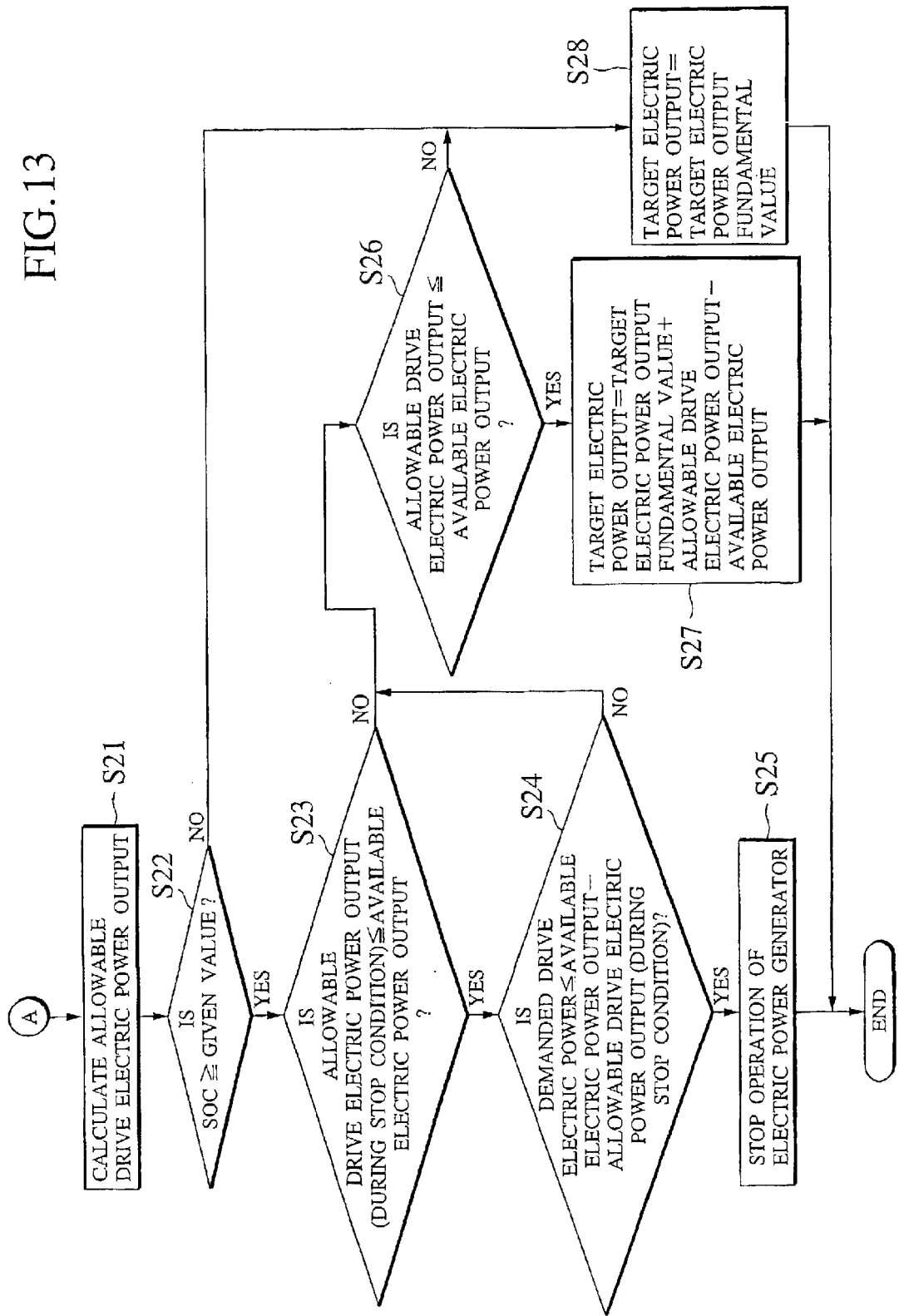
FIG. 13 is a flow chart illustrating the operation of a second preferred embodiment according to the present invention.

In FIG. 13, in step S21, the allowable drive electric power output PA is read out. In the presently described preferred embodiment, The allowable drive electric power output PA involves a steady state allowable drive electric power output PA1 determined for the stop condition of the electric power generator 101 and a steady state allowable drive electric power output PA2 for non-stop condition of the electric power generator 101, with these two parameters being read out.

In a consecutive step S22, it is discriminated whether the state of charge is equal to or greater than the given value (which is shown as S % in FIG. 6).

Subsequently, if the state of charge is equal to or greater than the given value, then, the operation goes to step S23, wherein it is discriminated whether the allowable drive electric power output (during the stop condition) PA1 is below available electric power output PO of the secondary battery unit 103.

If, in step S23, it is judged that allowable drive electric power output (during the stop condition) PA1 is below available electric power output PO of the secondary battery unit 103, then, in step S24, it is discriminated whether demanded drive electric power PD is below the differential value between available electric power output PO of the electric power storage unit 103 and allowable drive electric power output (during the stop condition) PA1.

If, in step S24, it is judged that demanded drive electric power PD is below the differential value between available electric power output PO of the electric power storage unit 103 and allowable drive electric power output (during the stop condition) PA1, the operation goes to step S25 to output a stop command to the electric power generator 101.

In contrast, in step S22, if it is judged that the state of charge is below the given value, the operation goes to step S28, where the target electric power output P to be produced is calculated in the following equation using the target electric power fundamental value P'. And, the current operation is completed and such operation is repeatedly executed at the given time intervals until the ignition key switch of the vehicle is turned off.

$$P=P' \tag{4}$$

Further, in step S23, if it is judged that the allowable drive electric power output (during the stop condition) PA1 exceeds available drive electric power output PO, or if it is judged in step S24 that demanded drive electric power PD exceeds the differential value between available electric power output PO of the electric power storage unit 103 and allowable drive electric power output (during the stop condition) PA1, then, the operation goes to step S26 where it is judged whether allowable drive electric power output (during the non-stop condition) PA2 is below available electric power output PO of the secondary battery unit 103.

Subsequently, if, in step S26, it is judged that allowable drive electric power output (during the non-stop condition) PA2 is below available drive electric power output PO of the secondary battery unit 103, the operation goes to step S27 where target electric power output P to be produced is calculated in the following equation (5) using the target electric power fundamental value P', allowable drive electric power output (during the non-stop condition) PA2 of the secondary battery unit 103 and available electric power output PO of the secondary battery unit 103.

$$P=P'-(PO-PA)=P'+PA-PO \tag{5}$$

If, in contrast, it is judged in step S26 that allowable drive electric power output (during the non-stop condition) PA2 exceeds available electric power output PO of the secondary battery unit 103, the operation goes to the aforementioned step S28 to calculate target electric power P. Then, the current operation is completed and such operation is repeatedly executed at the given time intervals until the ignition key switch of the vehicle is turned off.

In the preferred embodiment discussed above, it is arranged such that when the demanded drive electric power of the drive motor which responds to the demanded drive power is below the value of available electric power output from which allowable drive electric power output determined during the stop condition of the electric power generator is subtracted, the electric power generator is caused to be stopped. This results in a decrease in the number of frequencies of operating the electric power generator at a lower load side wherein an electric power generating efficiency remains at a low level in a general practice while improving fuel consumption. In addition, the presence of a capability for executing the stop in operation of the electric power generator while ensuring demanded allowable drive electric power output enables the same drive torque response to be obtained both in the stop and non-stop conditions of the electric power generator 101.

Third Preferred Embodiment

Figure 14:
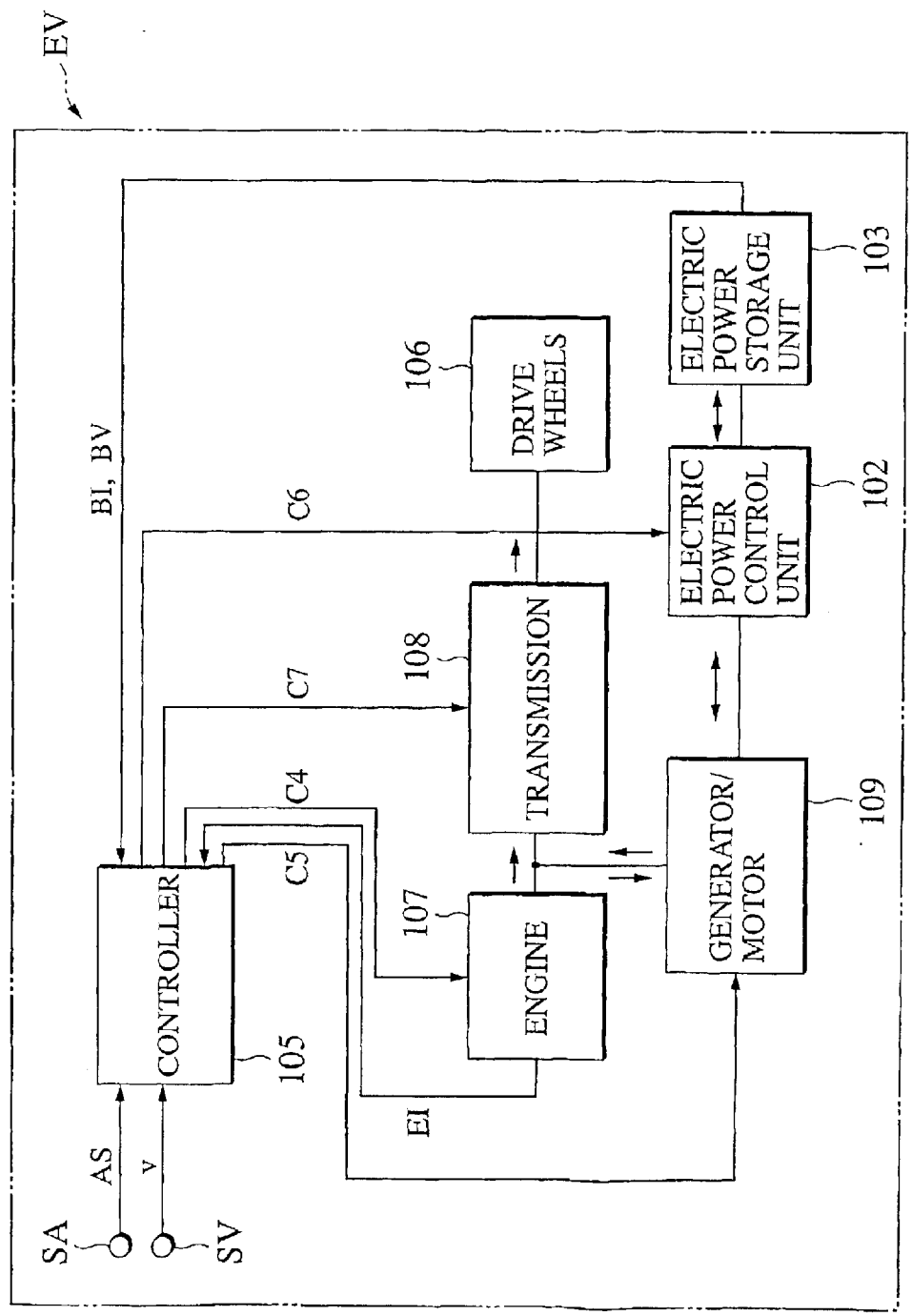
FIG. 14 is a structural view of a vehicle to which a vehicle control system of a third preferred embodiment of the present invention is applied.

FIG. 14 shows a structural overview of a vehicle EV to which a vehicle control system of a third preferred embodiment of the present invention is applied, with the vehicle being exemplarily shown as a so-called parallel hybrid vehicle with drive wheels driven by an engine and a drive motor. In the so-called parallel hybrid vehicle used in the present preferred embodiment, the vehicle drive source is comprised of the engine and the drive motor whereas, in the first preferred embodiment, the drive source is comprised only of the drive motor. Thus, replacing the electric power generator with the engine enables the present invention to be similarly described in principle. Also, the same component parts bear the same reference numerals as those used in the first preferred embodiment of FIG. 1 to suitably omit the redundant description.

In FIG. 14, the drive power produced by the engine 107 is transmitted to the drive wheels 106 via a transmission 108. An electric power generator motor (a motor generator) 109 converts a mechanical power (power output), delivered from the engine 107, into electric power which is converted by the electric power control unit 102 into electric power output with a voltage and an electric current to be stored in the electric power storage unit (the secondary battery unit) 103. Further, the electric power generator motor 109 is supplied with electric power output from the electric power storage unit 103 via the electric power control unit 102 to provide a mechanical power to assist the drive of the drive wheels 106. Also, the electric power generator motor 109 produces regenerative electric power output, responsive to regenerative braking of the vehicle during its deceleration, which is supplied to the electric power storage unit 103 via the electric power control unit 102.

The controller 105 functions to calculate a target engine power, which will be discussed below, on the basis of the vehicle conditions such as the accelerator's incremental displacement value AS, the vehicle speed, and state of charge information such as discharge current BI of the electric power storage unit 103 and battery charge voltage BV, to supply a command C4 to the engine and to control the engine 107 such that its power output is adjusted to a desired value. Further, the controller 105 functions to supply a command C5 to the electric power generator/motor 109 for controlling the same while applying a command C6 to the electric power control unit 102 to compel the same to produce electrical power output or mechanical power output. On one hand, the controller 105 functions to supply a command C7 to the transmission 108 for controlling the drive power of the drive wheels 106. Also, although the electric power generator motor has a unitary structure, it is, of course, possible for the electric power generator and the electric motor to be separately constructed.

Figure 15:
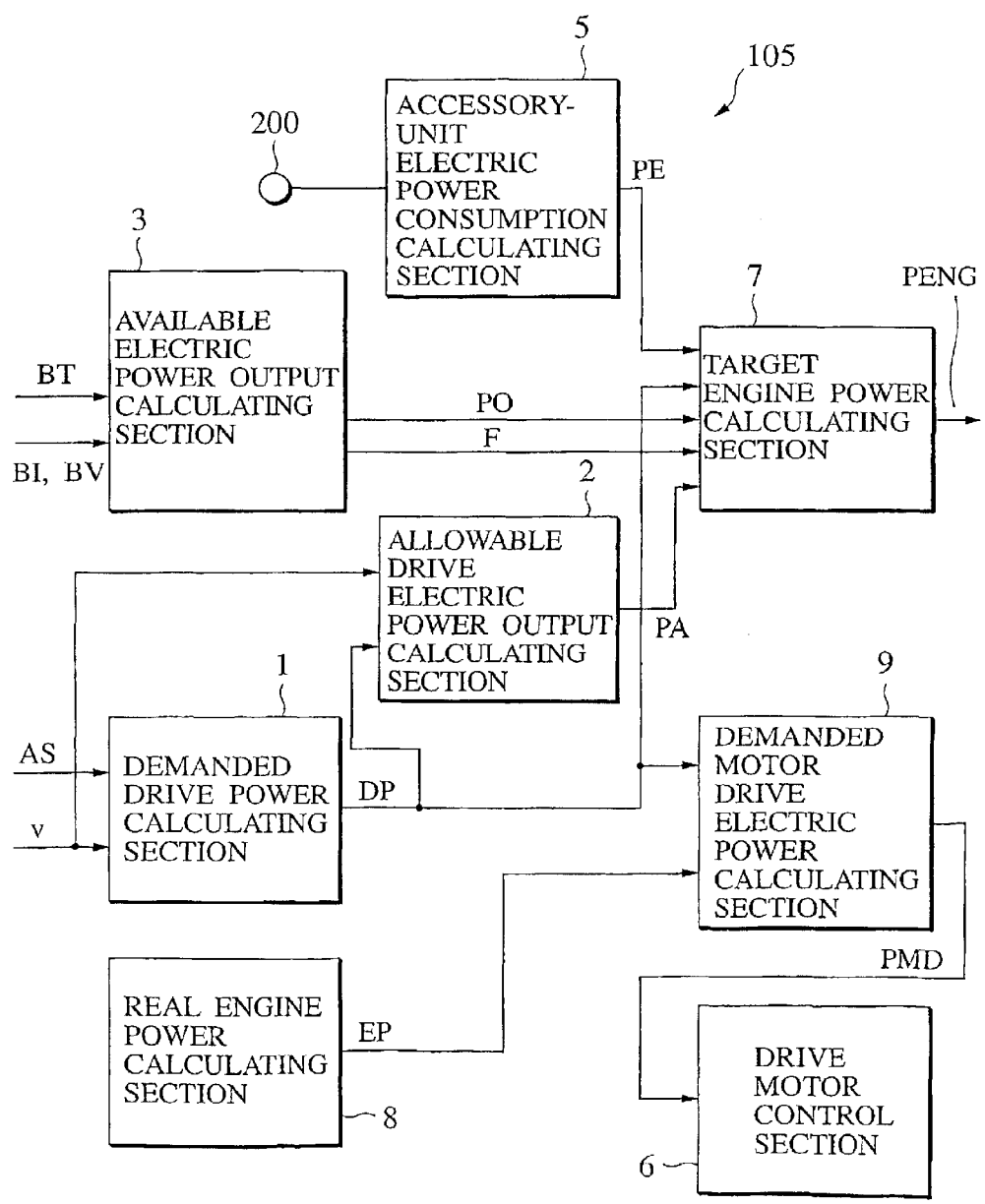
FIG. 15 is a detailed structural view of the vehicle control system of the third preferred embodiment.

FIG. 15 shows a basic structural overview of the controller 105 of the present preferred embodiment.

In FIG. 15, the controller 105 includes a demanded drive power calculating section 1 which calculates a demanded drive power DP demanded for the vehicle based on the accelerator's incremental displacement value AS and the vehicle speed, an allowable drive electric power output calculating section 2 which calculates allowable drive electric power output PA necessary for compensating the delayed response of the engine 107 with respect to the variation in the demanded drive power DP, a secondary-battery output available electric power calculating section 3 which calculates available electrical power output PO of the secondary battery unit 103 to be outputted on the basis of the state of charge of the secondary battery unit which forms the electric power storage unit 103, an accessory-unit electric power consumption calculating section 5 which calculates an accessory-unit electric power consumption PE, a target engine power calculating section 7 which calculates a target engine power PENG which represents a target power DP of the engine 107, and a real engine power calculating section 8 which calculates a real engine power EP which represents the real power of the engine. Further, the controller 105 includes a demanded motor electric power calculating section 9 which calculates demanded motor electric power PMD on the basis of the demanded drive power DP and the real engine power EP, and a drive motor control section 6 which controls the electric power generator motor 109 on the basis of demanded motor electric power PMD.

Figure 16:
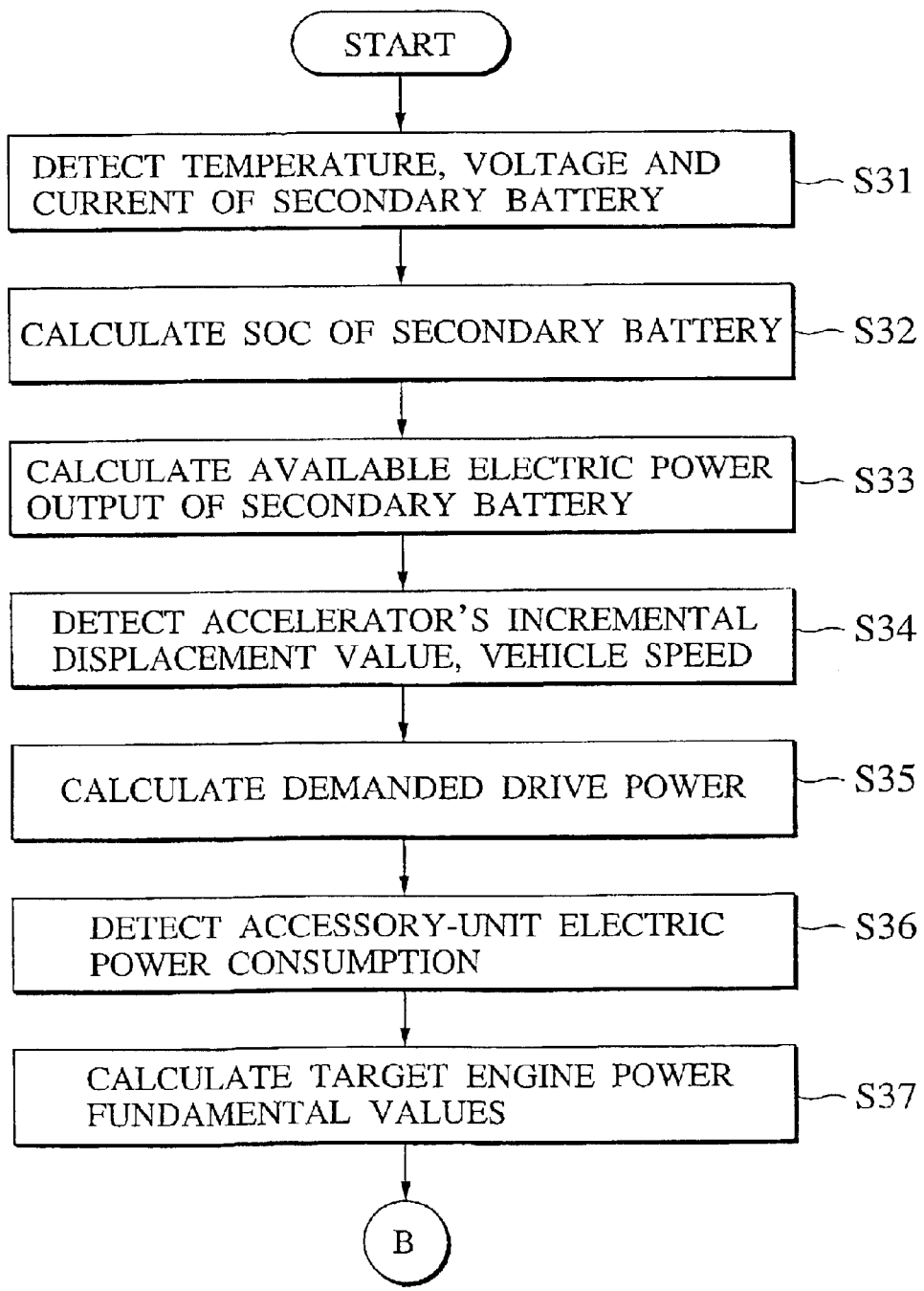
FIG. 16 is a flow chart of a first half illustrating the operation of the third preferred embodiment.
Figure 17:
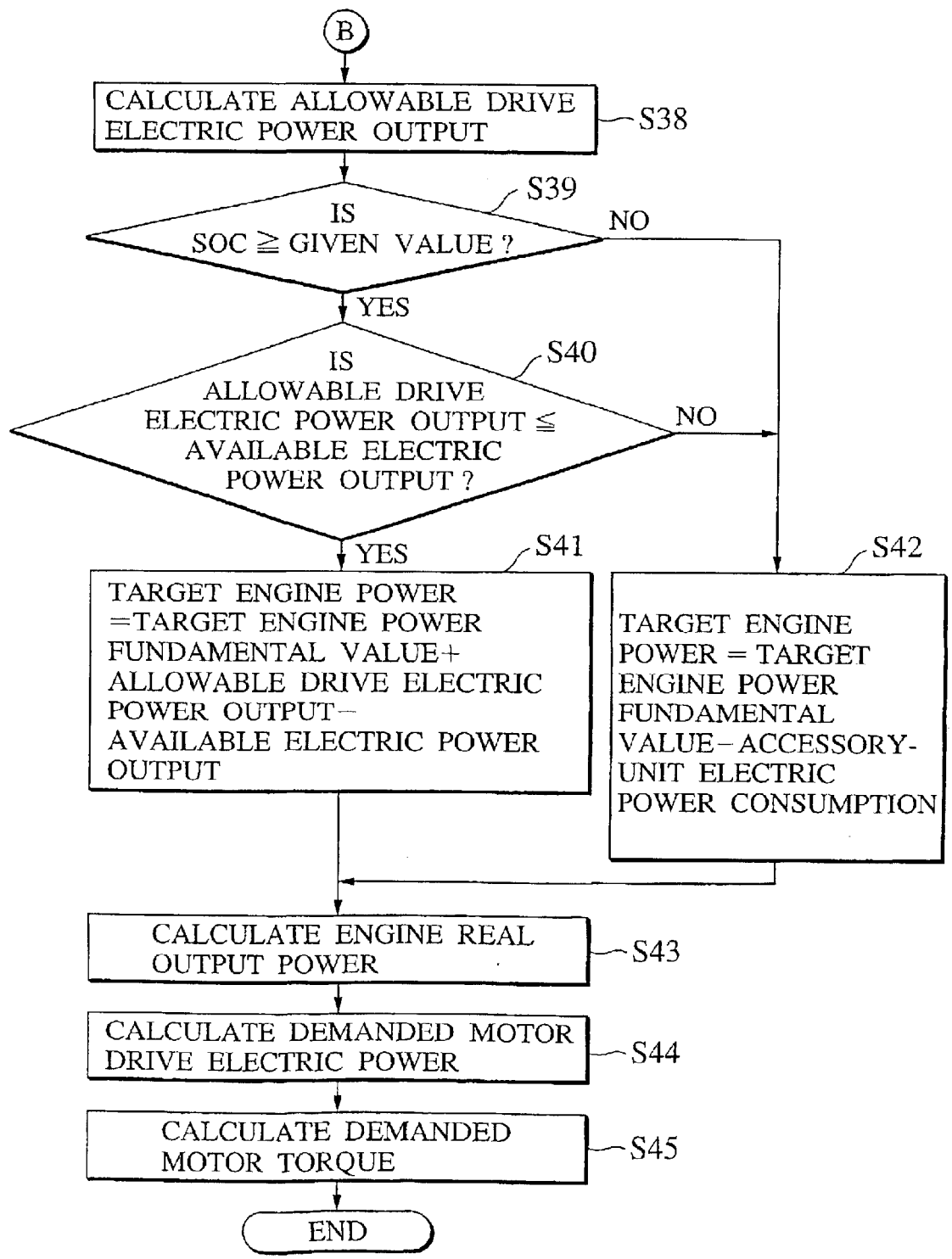
FIG. 17 is a flow chart of a rear half illustrating the operation of the third preferred embodiment.

Now, the operation of the controller 105 shown in FIG. 15 is described below in detail in conjunction with flow charts of FIGS. 16 and 17. Also, such an operation is initiated when the ignition key switch (not shown) of the vehicle is turned on.

In first step S31, electric current BI, battery discharge voltage BV and the temperature of the secondary battery unit 103 are detected.

In a subsequent step S32, the state of charge of the secondary battery unit 103 is calculated on the basis of the electric current BI, the voltage BV and the temperature BT. When this takes place, calculation is implemented referring to the chargeable and dischargeable electric power characteristic of the secondary battery 103 shown in FIG. 6 which has previously been used in conjunction with the first preferred embodiment.

In a succeeding step S33, available electric power output PO to be derived from the secondary battery unit 103 is calculated similarly as in step 3 of the first preferred embodiment.

In consecutive step S34, the accelerator's incremental displacement value AS and the vehicle speed are detected. Of course, range information representative of the shift rage may be detected.

In succeeding step S35, calculation is executed to determine drive torque demanded by a vehicle driver using a map on the basis of the accelerator's incremental displacement value AS, the vehicle speed v and range information, which have been detected, and the demanded drive power DP is calculated by multiplying the vehicle speed v to the drive torque.

In next step S36, calculation is performed to determine the accessory-unit consuming electric power PE indicative of ON/OFF state of the accessory units 200. Of course, the electric current and the voltage of the DC/DC converter (not shown) may be directly detected.

In step S37, subsequently, various values derived in the aforementioned steps are utilized to calculate the target engine power fundamental value PENG' in the following equation (6) using the demanded drive power DP and the accessory-unit consuming electric power PE.

$$PENG'=DP+PE \quad (6)$$

In consecutive step S38, allowable drive electric power output PA is calculated.

It is to be understood here that, in the presently described preferred embodiment, allowable drive electric power output PA may be understood by replacing the electric power output of the electric power generator shown in FIGS. 7A to 7C described in conjunction with the first preferred embodiment, with the power to be produced by the engine.

In other words, since a consideration has to be made for supplying power output to the drive wheels 106 from the engine 107 in the light of the delayed response of the same in order to realize the demanded drive power DP demanded by the vehicle driver, the allowable drive electric power output represents an allowance of electric power output which can be supplied to the electric power generator motor 109 from the secondary battery unit 103. That is, allowable drive electric power output PA corresponds to electric power output that is the result wherein available electric power output PO of the secondary battery unit 103 is subtracted by electric power output which is discharged from the secondary battery unit 103 and is supplied to the electric power generator motor 109. In the presently described preferred embodiment, the maximum value that is supposed to be that of the vehicle is arranged to be preliminarily stored in the ROM (not shown) of the controller 105 as allowable drive electric power output PA specified for the steady state condition, with the maximum value being suitably read out.

In succeeding step 39, it is judged whether the state of charge is equal to or greater than the given value (S %).

Subsequently, if it is judged in step S39 that the state of charge is equal to or greater than the given value, the operation goes to step S40 where allowable drive electric power output PA is below available electric power output PO of the secondary battery unit 103 or is above the same.

If, further, in step S40, it is judged that allowable drive electric power output PA of the secondary battery unit 103 is below available electric power output PO, then, the operation goes to step S41 where the target engine power PENG is calculated in the following equation (7) using the target engine power fundamental value PENG', available electric power output PO and allowable drive electric power output PA.

$$PENG=PENG'-(PO-PA)=PENG'+PA-PO \quad (7)$$

The above equation expresses that the power output of the engine 107 is compensated for the power output which corresponds to a value wherein a differential value between available electric power output PO of the secondary battery unit 103 and allowable drive electric power output PA is subtracted from the target engine power fundamental value PENG' which is the sum of the demanded drive power DP of the vehicle ad accessory-unit electric power consumption PE. When this occurs, if the vehicle remains in the steady state condition, i.e. in the non-accelerating condition, the target engine power PENG and the real engine power EP is identical to one another. In such a case, as will be discussed later, the secondary battery unit 103 produces electric power output, which is equal to a value wherein allowable drive electric power output PA is subtracted from available electric power output PO of the secondary battery unit 103, for driving the electric power generator motor 109.

On the other hand, if it is judged in step 39 that the state of charge is less than the given value, or if it is judged in step S40 that allowable drive electric power output PA of the secondary battery unit 103 exceeds available electric power output PO due to some reasons, then, the operation goes to step S42 where the target engine power PENG is calculated in the following equation (8) using the target engine power fundamental value PENG' and accessory-unit electric power consumption PE:

$$PENG = PENG' - PE \qquad (8)$$

This means that the power output of the engine 107 covers the whole of the drive power except for accessory-unit electric power consumption PE of the vehicle whereas only accessory-unit electric power consumption PE is supplied from the secondary battery unit 103.

In succeeding step S43, the real power EP of the engine 107 is calculated. The real power EP of the engine 107 may be calculated using engine information EI, though not shown for detailed sensors, a multiplied result between the torque value detected by the torque sensor and the rotational speed value detected by the engine rotational speed sensor, and the engine rotational speed detected on the basis of the detected value such as a fuel injection quantity or an air flow rate representative of engine torque.

Subsequently, is step S44, demanded motor drive electric power PMD is calculated in the following equation (9) using demanded drive power DP and the real power EP of the engine.

$$PMD = DP - EP \qquad (9)$$

In consecutive step S45, demanded motor torque TMD correlated with the electric power generator motor 109 is calculated in the following equation (10) using demanded motor drive electric power PMD and the detected engine rotational speed ES. And, current operation is completed and repeatedly executed at the given time intervals until the ignition key switch of the vehicle is turned off.

$$TMD = PMD/ES \qquad (10)$$

With such a structure of the presently described preferred embodiment, further, since it is supposed that an output shaft of the electric power generator motor 109 is coupled to an output shaft of the engine 107, demanded motor torque TMD is determined by dividing demanded motor drive electric power PMD by the engine rotational speed ES. However, with variations in structure, the power output may be calculated from demanded motor drive electric power PMD in a suitable manner.

Now, the operation of the above steps is more clearly described with reference to FIG. 18.

Figure 18:
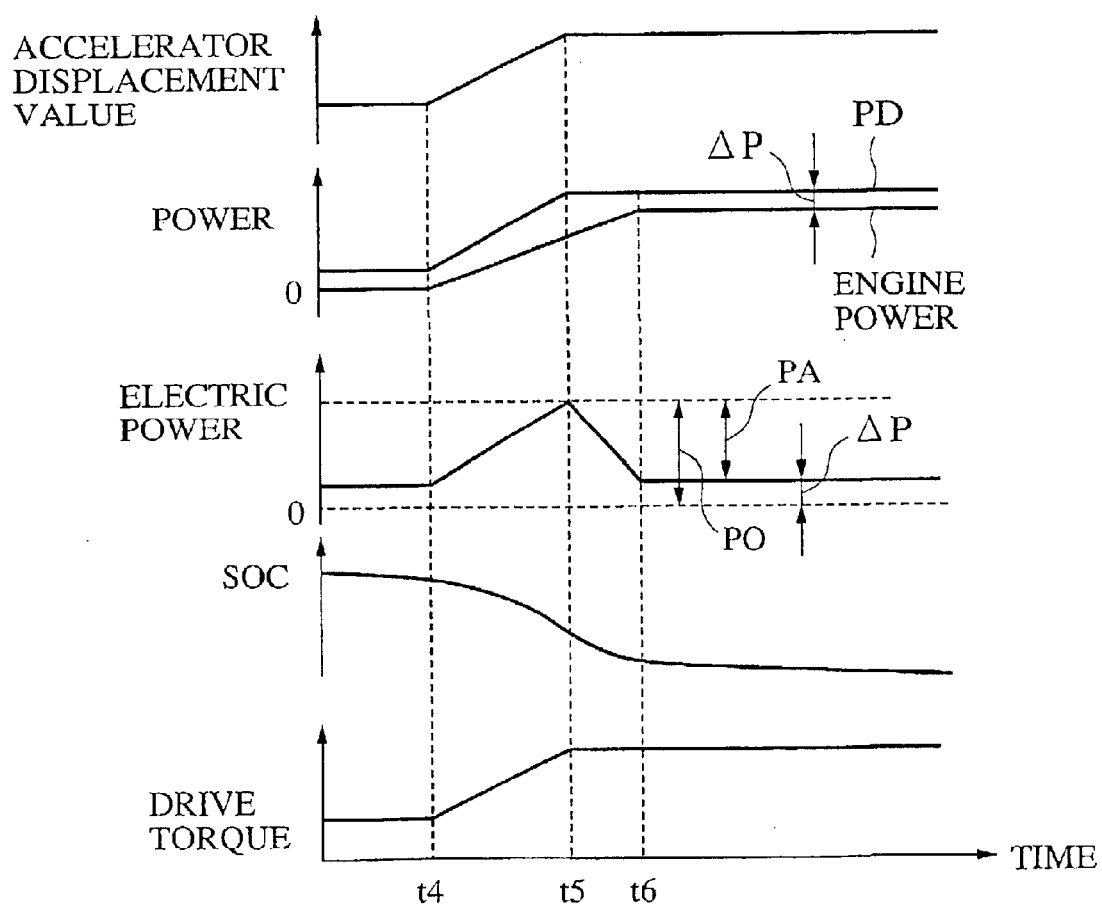
FIG. 18 is a view illustrating power output of an engine, electric power output of the secondary battery unit, the state of charge (SOC) of the secondary battery unit, and drive torque, in a sequential manner, of the third preferred embodiment in a case where an accelerator is operated.

FIG. 18 is a view substantially identical in content with FIG. 8 described in conjunction with the first preferred embodiment except that the engine 107 is replaced with the electric power generator 101. During a time period prior to time instant t4 at which the accelerator pedal is depressed, the secondary battery unit 103 produces electric power output, corresponding to the differential value between available electric power output PO of the secondary battery unit 103 and allowable drive electric power output PA, which is supplied to the electric power generator motor 109. Even when the accelerator pedal is depressed during a time interval after t4, since allowable drive electric power output PA is sufficiently ensured, the secondary battery unit 103 may supply electric power output to the electric power generator motor 109 up to a full level of available electric power output PO of the secondary battery unit 103. As a consequence, The short state of the drive power caused by the delay in response of the engine 107 with respect to the demanded drive power DP can be compensated, enabling the realization of the response of the desired drive power (and accordingly the desired drive torque).

In the presently described preferred embodiment, further, it has been described above that the allowable drive electric power output PA is regarded as the maximum value to be supposed as the vehicle. However, although the engine 107 described in the presen preferred embodiment is supposed to be specifically an internal combustion engine, such an engine 107 is regarded to have a characteristic in that, in the operating characteristic of the drive motor studied in FIG. 11, the torque and the rotational speed most likely corresponds to the engine torque and the engine rotational speed, respectively. Accordingly, even in such a case wherein the output shaft of the electric power generator motor 109 is coupled to the output shaft of the engine 107 as in the presently described preferred embodiment, as previously described with reference to FIGS. 10A and 10B in the first preferred embodiment, it is of course possible to determine allowable drive electric power output PA depending on the vehicle speed and the demanded drive power (demanded drive electric power) for increasing the number of frequencies or the amount of electric power to be discharged from the secondary battery unit 103. With such a structure, when taking the stop condition of the engine 107 into consideration, there is a need for larger time intervals for the engine start-up or the rise-up of the engine torque than those required in a condition where the engine remains in the non-stop condition until the engine 107 operates from its stop condition to the desired engine power output. Thus, while, in the first preferred embodiment shown in FIGS. 10A and 10B, two parameters of the allowable drive electric power output PA are settled both for the operating condition and the stop condition of the electric power generator 101, in the presently described preferred embodiment, the two parameters of allowable drive electric power output PA are settled both for the operating condition and the stop condition of the engine 107 such that the allowable drive electric power output during the stop condition of the engine has a value added with that during the engine operating condition.

It will thus be appreciated from the foregoing description that, in the presently described preferred embodiment, the vehicle control system, which is comprised of the engine, the electric power generator driven by the engine to produce electric power output, the electric power storage unit for storing electric power output produced from the electric power generator, the drive motor driven by electric power output supplied from at least one of the electric power generator and the electric power storage unit and the drive wheels driven by power output delivered from at least one of the engine and the drive motor, includes the demanded drive power calculating section which calculates the demanded drive power demanded for driving the vehicle, the allowable drive electric power output calculating section which calculates allowable drive electric power output necessary for compensating the delayed response of the engine with respect to the variations in the demanded drive power, the available electric power output calculating section which calculates available electric power output to be produced by the electric power storage unit on the basis of the state of charge of the electric power storage unit, the target engine power calculating section which calculates the target engine power of the engine on the basis of the demanded drive power, allowable drive electric power output and available electric power output of the electric power storage unit, the real engine power calculating section which calculates the real power of the engine, the demanded motor drive electric power calculating section which calculates the demanded electric power to be supplied to the drive motor on the basis of the demanded power and the real engine power, and the drive motor control unit which controls the drive motor in accordance with the demanded motor drive electric power. Thus, the vehicle control system is advantageous in that the engine control is performed while permitting allowable drive electric power output necessary for the accelerating operation of the vehicle to be left.

Further, the target engine power calculating section determines the target engine power by subtracting the value, obtained by subtracting allowable drive electric power output from available electric power output of the electric power storage unit, from the demanded drive power when the amount of electric power stored in the electric power storage unit exceeds the given value and available electric power output of the electric power storage unit exceeds allowable drive electric power output. In this respect, the demanded motor drive electric power calculating section determines demanded motor drive electric power such that is has a value equal to that obtained by subtracting the real engine power from the demanded drive power. Thus, such a structure provides an important advantage in that the motor is supplied with electric power from the electric power storage unit so as to assist the engine torque while permitting an adequate amount of allowable drive electric power output necessary for the acceleration of the vehicle to be left at all times. As a consequence, it is possible for the desired drive torque response to be obtained at all times during the acceleration and, at the same time, the electric power storage unit is enabled to positively discharge electric power output when the amount of electric power charged in the electric power storage unit remains at a higher level than the given value, with a resultant capability in precluding the electric power storage unit from being overcharged. In addition, when the amount of electric power stored in the electric power storage unit exceeds the given value, electric power output is positively discharged, resulting in highly improved fuel consumption.

Further, the presence of the accessory-unit electric power consumption calculating section enabling to obtain accessory-unit electric power consumption of the accessory units of the vehicle allows the target engine power calculating section to determine the target engine power by subtracting the value, obtained by subtracting allowable drive electric power output from available electric power output to be produced by the electric power storage unit, from the value obtained by adding accessory-unit electric power consumption to the demanded drive power when the amount of electric power stored in the electric power storage unit is equal to or greater than the given value and available electric power output of the electric power storage unit is equal to or greater than allowable drive electric power output,. Thus, it is possible for accessory-unit electric power consumption to be taken into consideration even in the vehicle having the accessory units driven by electric power output of the electric power storage unit to allow target electric power to be precisely calculated.

Further, the allowable drive electric power output calculating section functions to calculate allowable drive electric power output on the basis of at least one of the vehicle speed and the demanded drive power.

Also, the presence of the allowable drive electric power output calculating section which calculates allowable drive electric power output on the basis of at least one of the vehicle speed and the demanded drive power enables allowable drive electric power output required in the parallel hybrid vehicle to be calculated in accordance with the vehicle conditions, with a resultant increase in the number of frequencies or the amount of electric power to be discharged from the electric power storage unit to provide improved fuel consumption.

In addition, the presence of the allowable drive electric power output calculating section arranged to select either small one of first allowable drive electric power output determined on the basis of the vehicle speed and second allowable drive electric power output determined on the basis of the demanded drive power allows desired allowable drive electric power output to be calculated in accordance with the operating characteristic of the drive motor, the preset demanded drive power characteristic and the vehicle conditions even in the parallel hybrid vehicle.

Fourth Preferred Embodiment

Now, a description is given to a vehicle control system of a fourth preferred embodiment of the present invention which enables a stop in the engine 107 at a given state.

The structure of the presently described preferred embodiment is similar to that of the third preferred embodiment and, therefore, a detailed description of the same is herein omitted. Since, also, the operation is identical to that which involves steps up to step S37 shown in FIG. 16 which is referred to in the third preferred embodiment, the description of the same is omitted and the operation subsequent to that step will be described with reference to the flow chart of FIG. 19.

Figure 19:
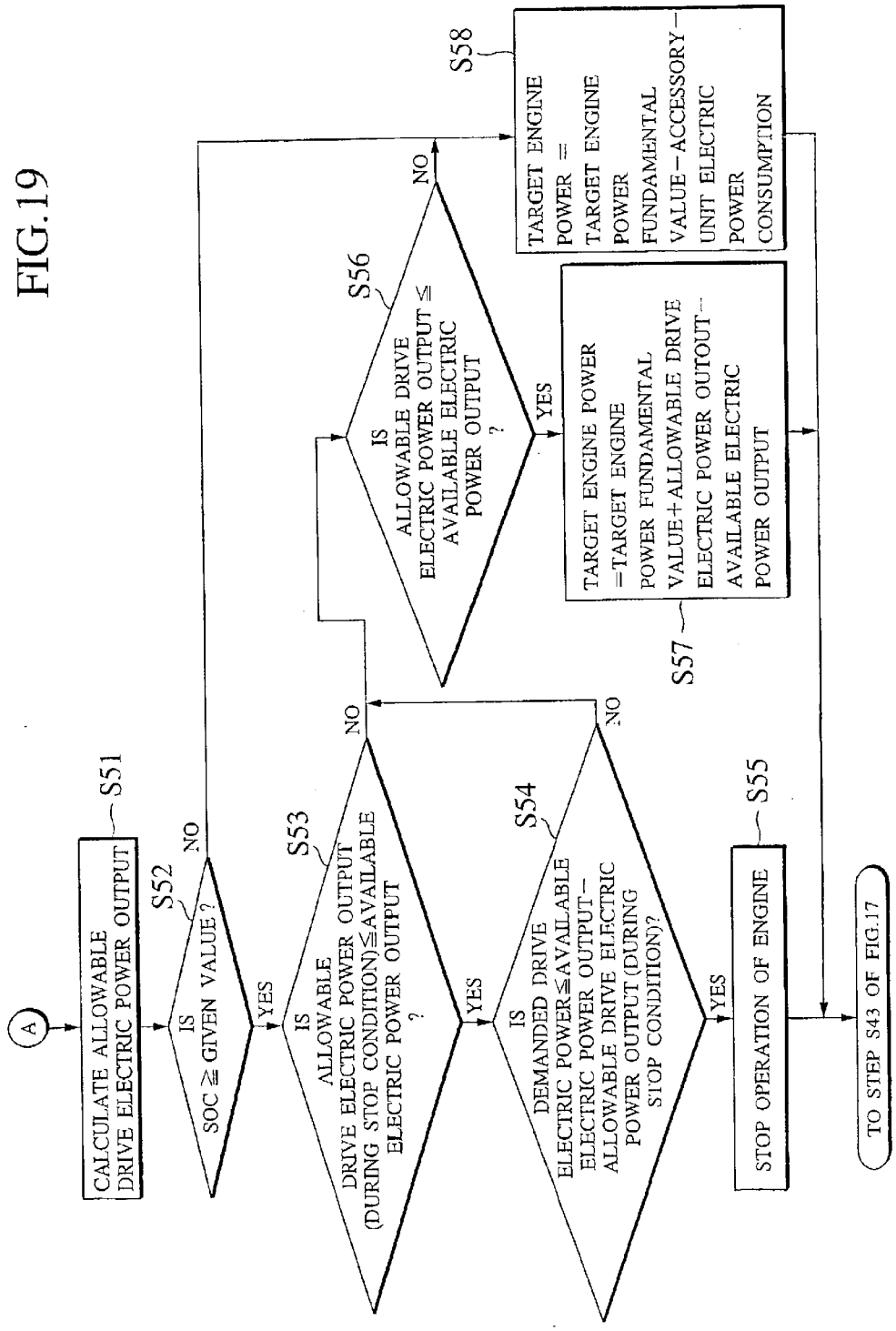
FIG. 19 is a flow chart illustrating the operation of a fourth preferred embodiment according to the present invention.
Figure 20:
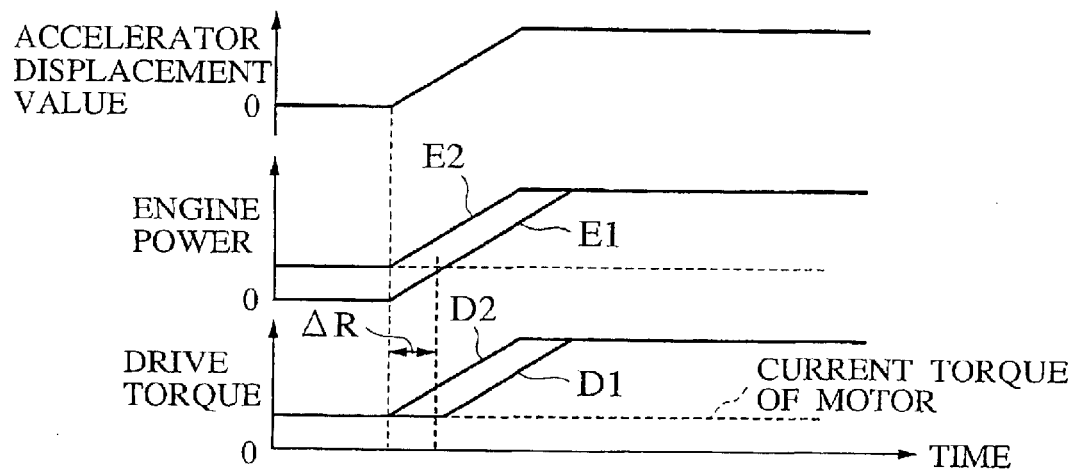
FIG. 20 is a view illustrating output power of the engine and related drive torque in a sequence to be obtained in a case where the accelerator is operated in a parallel hybrid vehicle which has been studied by the inventor of the present patent application.
Figure 21:
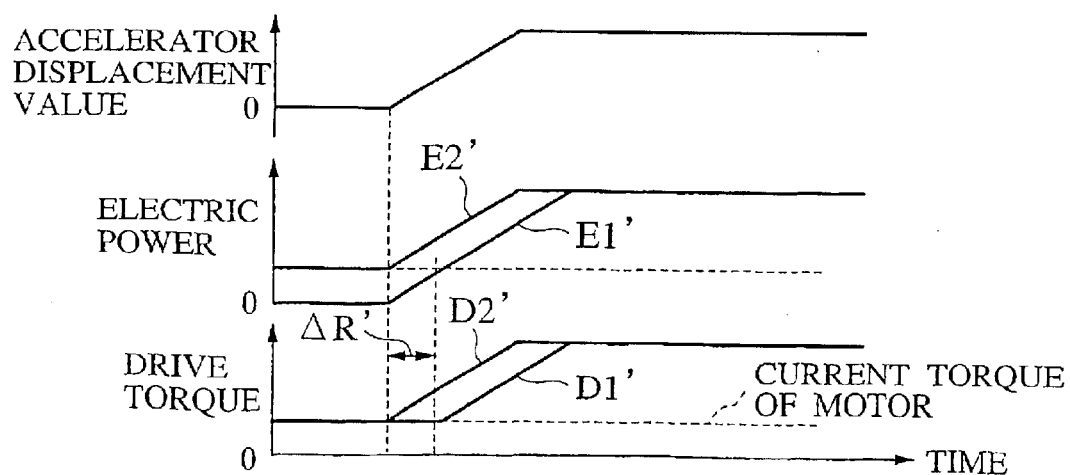
FIG. 21 is a view illustrating output power of the engine and related drive torque in a sequence to be obtained in a case where the accelerator is operated in a series hybrid vehicle which has been studied by the inventor of the present patent application

In FIG. 19, in step S51, the allowable drive electric power output PA is read out. In the presently described preferred embodiment, the allowable drive electric power output is composed of the steady state allowable drive electric power output PA1 during the stop condition of the engine 107 and the allowable drive electric power output PA2 during the non-stop condition of the engine 107, with these two parameters being read out.

In consecutive step S52, it is discriminated whether the state of charge exceeds the given value (S %) or is below the same.

Subsequently, if, in step S52, it is judged that the state of charge is equal to or greater than the given value, the operation goes to step S53 at which it is discriminated whether allowable drive electric power output (during the stop condition) PA1 is below available electric power output PO of the secondary battery unit 103.

In next step S53, if it is judged that the allowable drive electric power output (during the stop condition) PA1 is below available electric power output PO of the secondary battery unit 103, the operation goes to step S54 wherein it is discriminated whether demanded drive electric power PD is equal to or greater than the differential value between available electric power output PO of the secondary battery unit 103 and allowable drive electric power output (during the stop condition) PA1.

If, in step S54, it is judged that demanded drive electric power PD is below the differential value between available electric power output of the secondary battery unit 103 and allowable drive electric power output (during the stop condition) PA1, the operation goes to step S55 at which the engine stop command is applied to the engine 107. Then, the subsequent operation goes to step S43 in FIG. 17 and, thereafter, the operation is executed in the same manner as that of the third preferred embodiment.

On the other hand, if, in step S52, it is judged that the state of charge is less than the given value, the operation goes to step S58 wherein the target engine power PENG is calculated in the following equation (11) using the target engine power fundamental value PENG' and accessory-unit electric power consumption PE:

$$PENG = PENG' - PE \qquad (11)$$

Further, in step S53, if it is judged that allowable drive electric power output (during the stop condition) PA1 is less than available electric power output PO of the secondary battery unit 103, or if, in step S54, it is judged that demanded drive electric power PD is less than the differential value between available electric power output PO of the secondary battery unit 103 and allowable drive electric power output (during the stop condition) PA1, then the operation goes to step S56 wherein it is discriminated whether allowable drive electric power output (during the non-stop condition) PA2 is below available electric power output PO.

Subsequently, if, in step S56, it is judged that allowable drive electric power output (during the non-stop condition) PA2 is less than available electric power output PO, the operation goes to step S57 wherein the target engine power PENG is calculated in the following equation (12) using the target engine power fundamental value PENG', available electric power output PO and allowable drive electric power output PA.

$$PENG=PENG'-(PO-PA)=PENG'+PA-PO \quad (12)$$

In contrast, in step S56, if it is judged that allowable drive electric power output (during the non-stop condition) PA2 is greater than the available electric power output of the secondary battery unit 103, the operation goes to step S58 and, thereafter, the operator goes to step S43 in FIG. 15 for implementing the same operation as that in the third preferred embodiment.

In the present preferred embodiment discussed above, if demanded drive power is less than the value wherein the allowable drive electric power output determined for the stop condition of the engine is subtracted from available electric power output of the electric power storage unit, then, the engine is caused to be stopped. Therefore, in addition to the advantages of the third preferred embodiment, it is possible to reduce the number of frequencies of operating the engine at a lower load side at which heat efficiency is generally at a low level, resulting in improved fuel consumption.

Also, the presence of a capability of executing the engine-stop operation while ensuring allowable drive electric power output necessary for the engine stop condition enables the torque response to be obtained in an equal manner both in the engine stop condition and the non-stop condition of the engine.

The entire content of a Patent Application No. TOKUGAN 2001-062500 with a filing date of Mar. 6, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

Industrial Applicability

As clearly understood from the foregoing description given above, since the present invention has a structure to calculate the demanded drive power required for driving the vehicle, to calculate allowable drive electric power output necessary for compensating the delayed response of the drive source or the power supply section with respect to the demanded power, to calculate available electric power output of the electric power storage unit on the basis of the state of charge of the same and to calculate target power to be produced by the drive source or the power supply section on the basis of the demanded drive power, allowable drive electric power output of the electric power storage unit and available electric power output of the electric power storage unit, the vehicle control can be performed while ensuring the allowable drive electric power output of the electric power storage unit necessary for the accelerating operation of the vehicle. Accordingly, the control system and the control method of the present invention can be applied to the so-called series hybrid vehicle, the parallel hybrid vehicle and the fuel cell powered vehicle, etc., and also the wide range of industrial applicability thereof can be expected.

What is claimed is:

1. A control system for a vehicle having an electric power generator, an electric power storage unit, a drive motor driven by electric power supplied from at least one of the electric power generator and the electric power storage unit, and drive wheels driven by drive power supplied from the drive motor, the control system comprising:

a demanded drive power calculating section calculating a demanded drive power required for driving the vehicle;

an allowable drive electric power output calculating section calculating allowable drive electric power output of the electric power storage unit required for compensating a delayed response of the electric power generator with respect to a variation in the demanded drive power;

an available electric power output calculating section calculating available electric power output of the electric power storage unit to be outputted on the basis of a state of charge of the electric power storage unit, the available electric power output being electric power outputable from the electric power storage unit; and a target electric power output calculating section calculating to be produced from the electric power generator on the basis of the demanded drive power, the allowable drive electric power output of the electric power storage unit and the available electric power output of the electric power storage unit, wherein the control system controls the electric power storage unit on the basis of the allowable drive electric power output and the available electric power output, and the electric power generator on the basis of the target electric power output so as to control the vehicle correspondingly to the demanded drive power.

2. A control system according to claim 1, wherein the target electric power output calculating section determines the target electric power by subtracting a value, obtained by subtracting the allowable drive electric power output of the electric power storage unit from the available electric power output of the electric power storage unit, from demanded drive electric power of the drive motor corresponding to the demanded drive power when the state of charge of the electric power storage unit is equal to or greater than a given value and the available electric power output of the electric power storage unit is equal to or greater than the allowable drive electric power output of the electric power storage unit.

3. A control system according to claim 1, wherein the target electric power output calculating section determines the target electric power output to be demanded drive electric power of the drive motor corresponding to the demanded drive power when the available electric power output of the electric power storage unit is less than the allowable drive electric power output of the electric power storage unit.

4. A control system according to claim 1, further comprising an accessory-unit electric power consumption calculating section determining accessory-unit electric power consumption of accessory units of the vehicle;

wherein the target electric power output calculating section determines the target electric power output by subtracting a value, obtained by subtracting the allowable drive electric power output of the electric power storage unit from the available electric power output of the electric power storage unit, from a value obtained by adding the accessory-unit electric power consumption to demanded drive electric power of the drive motor corresponding to the demanded drive power when the state of charge of the electric power storage unit is equal to or greater than a given value and the available electric power output of the electric power storage unit is equal to or greater than the allowable drive electric power output of the electric power storage unit.

5. A control system according to claim 1, further comprising an accessory-unit electric power consumption calculating section determining accessory-unit electric power consumption of accessory units of the vehicle;

wherein the target electric power output calculating section determines the target electric power output to be a value obtained by adding the accessory-unit electric power consumption to a demanded drive electric power of the drive motor corresponding to the demanded drive power when the available electric power output of the electric power storage unit is less than the allowable drive electric power output of the electric power storage unit.

6. A control system according to claim 1, wherein the allowable drive electric power output calculating section calculates the allowable drive electric power output of the electric power storage unit on the basis of at least one of a vehicle speed and the demanded drive power.

7. A control system according to claim 6, wherein the allowable drive electric power output calculating section selects a small one of first allowable drive electric power output of the electric power storage unit determined on the basis of the vehicle speed and a second allowable drive electric power output of the electric power storage unit determined on the basis of the demanded drive power.

8. A control system according to claim 1, wherein the electric power generator is stopped in operation when demanded drive electric power of the drive motor corresponding to the demanded drive power is less than a value obtained by subtracting the allowable drive electric power output of the electric power storage unit, which is attained during a stop condition of the electric power generator, from the available electric power output of the electric power storage unit.

9. A control system according to claim 1, wherein the electric power generator is driven by use of a fuel cell or the engine.

10. A control system for a vehicle having an electric power generator, an electric power storage unit, a drive motor driven by electric power supplied from at least one of the electric power generator and the electric power storage unit, and drive wheels driven by drive power supplied from at least one of the engine and the drive motor the drive motor, the control system comprising:

a demanded drive power calculating section calculating a demanded drive power required for driving the vehicle;

an allowable drive electric power output calculating section calculating allowable drive electric power output of the electric power storage unit required for compensating a delayed response of the electric power generator with respect to a variation in the demanded drive power;

an available electric power output calculating section calculating available electric power output of the electric power storage unit to be outputted on the basis of a state of charge of the electric power storage unit, the available electric power output being electric power outputable from the electric power storage unit;

a target engine power calculating section calculating a target engine power of the engine on the basis of the demanded drive power, the allowable drive electric power output of the electric power storage unit and the available electric power output of the electric power storage unit;

a real engine power calculating section calculating a real power of the engine;

a demanded motor drive electric power calculating section calculating demanded motor drive electric power to be supplied to the drive motor on the basis of the demanded power and the real engine power; and a drive motor control section controlling the drive motor in accordance with the demanded motor drive electric power, wherein the control system controls the electric power storage unit on the basis of the allowable drive electric power output and the available electric power output, the engine on the basis of the target engine power, and the drive motor on the basis of the demanded motor drive electric power so as to control the vehicle correspondingly to the demanded drive power.

11. A control system according to claim 10, wherein the target engine power calculating section determines the target engine power by subtracting a value, obtained by subtracting the allowable drive electric power output of the electric power storage unit from the available electric power output of the electric power storage unit, from the demanded drive power when the state of charge of the electric power storage unit is equal to or greater than a given value and the available electric power output of the electric power storage unit is equal to or greater than the allowable drive electric power output of the electric power storage unit.

12. A control system according to claim 10, wherein the target engine power calculating section determines the target engine power to be the demanded drive power when the available electric power output of the electric power storage unit is less than the allowable drive electric power output of the electric power storage unit.

13. A control system according to claim 10, wherein the demanded motor drive electric power calculating section determines the demanded motor drive electric power to be a value obtained by subtracting the real engine power from the demanded drive power.

14. A control system according to claim 10, further comprising an accessory-unit electric power consumption calculating section determining accessory-unit electric power consumption of accessory units of the vehicle;

wherein the target engine power calculating section determines the target engine power by subtracting a value, obtained by subtracting the allowable drive electric power output of the electric power storage unit from the available electric power output of the electric power storage unit, from a value obtained by adding the accessory-unit electric power consumption to the demanded drive power when the state of charge of the electric power storage unit is equal to or greater than a given value and the available electric power output of the electric power storage unit is equal to or greater than the allowable drive electric power output of the electric power storage unit.

15. A control system according to claim 10, further comprising an accessory-unit electric power consumption calculating section determining accessory-unit electric power consumption of accessory units of the vehicle;

wherein the target engine power calculating section determines the target engine power to be a value obtained by adding the accessory-unit electric power to the demanded drive power when the available electric power output of the electric power storage unit is less than the allowable drive electric power output of the electric power storage unit.

16. A control system according to claim 10, wherein the allowable drive electric power output calculating section calculates the allowable drive electric power output of the electric power storage unit on the basis of at least one of a vehicle speed and the demanded drive power.

17. A control system according to claim 16, wherein the allowable drive electric power output calculating section selects a small one of a first allowable drive electric power output of the electric power storage unit determined on the basis of the vehicle speed and a second allowable drive electric power output of the electric power storage unit determined on the basis of the demanded drive power.

18. A control system according to claim 10, wherein the engine is stopped in operation when the demanded drive power is less than a value obtained by subtracting the demanded drive electric power, which is attained during a stop condition of the engine, from the available electric power output of the electric power storage unit.

19. A control system for a vehicle having a driving means, and a power supplying means including an electric power storage unit and supplying power output to the driving means, the control system comprising:

demanded power calculating means for calculating a demanded drive power required for driving the vehicle;

allowable electric power output calculating means for calculating allowable electric power output of the electric power storage unit necessary for compensating a delayed response of the power supplying means with respect to a variation in the demanded drive power;

available electric power output calculating means for calculating available electric power output of the electric power storage unit on the basis of a state of charge of the electric power storage unit; and target power output calculating means for calculating target power output to be produced by the power supplying means on the basis of the demanded drive power, the allowable electric power output and the available electric power output, wherein the control system controls the vehicle correspondingly to the demanded drive power on the basis of the allowable drive electric power output, the available electric power output and the target power output.

20. A method of controlling a vehicle having a drive section, and a power supply section including an electric power storage unit and supplying power output to the drive section, the method comprising:

calculating a demanded drive power required for driving the vehicle;

calculating allowable electric power output of the electric power storage unit necessary for compensating a delayed response of the power supply section with respect to a variation in the demanded drive power;

calculating available electric power output of the electric power storage unit on the basis of a state of charge of the electric power storage unit; and calculating target power output to be produced by the power supply section on the basis of the demanded drive power, the allowable electric power output and the available electric power output, wherein the vehicle is controlled correspondingly to the demanded drive power on the basis of the allowable drive electric power output, the available electric power output and the target power output.

* * * * *